United States Patent
Freese et al.

(10) Patent No.: US 12,238,219 B2
(45) Date of Patent: Feb. 25, 2025

(54) DEAL ROOM PLATFORM USING ARTIFICIAL INTELLIGENCE

(71) Applicant: Intralinks, Inc., New York, NY (US)

(72) Inventors: John Michael Freese, Cornelius, NC (US); Marco Vinicio Aguilar Soto, Belmont, MA (US); Michael James Fox, Sparks, NV (US)

(73) Assignee: Intralinks, Inc., New York, NY (US)

( * ) Notice: Subject to any disclaimer, the term of this patent is extended or adjusted under 35 U.S.C. 154(b) by 736 days.

(21) Appl. No.: 16/574,666

(22) Filed: Sep. 18, 2019

(65) Prior Publication Data
US 2020/0097768 A1    Mar. 26, 2020

Related U.S. Application Data

(60) Provisional application No. 62/733,959, filed on Sep. 20, 2018.

(51) Int. Cl.
*G06F 16/93*     (2019.01)
*G06F 16/18*     (2019.01)
(Continued)

(52) U.S. Cl.
CPC ........ *H04L 9/3239* (2013.01); *G06F 16/1805* (2019.01); *G06F 16/3344* (2019.01);
(Continued)

(58) Field of Classification Search
CPC ..... G06N 20/00; G06F 16/285; G06F 16/254; G06F 16/93; G06F 16/3344; G06K 9/626; G06Q 50/18
See application file for complete search history.

(56) References Cited

U.S. PATENT DOCUMENTS 9,811,586 B2    11/2017  Wetherell et al.
10,162,850 B1 *  12/2018  Jain .................... G06N 20/00
(Continued)

FOREIGN PATENT DOCUMENTS

WO    WO-2017190057 A1    11/2017

OTHER PUBLICATIONS

International Preliminary Search & Written Opinion for Application No. PCT/US2019/051858 dated Apr. 1, 2021, 7 pages.
(Continued)

*Primary Examiner* — Hau H Hoang
(74) *Attorney, Agent, or Firm* — MOSER TABOADA

(57) ABSTRACT

In embodiments, a method for managing documents in an electronic deal room associated with a document-intensive activity, the method comprising: receiving, by a processing system of a deal room platform, a request to upload a document to the electronic deal room from a user device associated with a user participating in the deal; receiving, by the processing system, the document from a document source; determining, by the processing system, a classification of the document based on one or more features of the document and a machine-learned document classification model that is trained to classify documents involved in document-intensive activities; identifying, by the processing system, one or more folders of an organizational structure having a plurality of folders corresponding to the electronic deal room based on the classification; and associating, by the processing system, the document with the one or more folders.

20 Claims, 8 Drawing Sheets

(51) Int. Cl.

| | | |
|---|---|---|
| *G06F 16/33* | (2019.01) | |
| *G06F 16/334* | (2025.01) | |
| *G06F 18/21* | (2023.01) | |
| *G06F 18/214* | (2023.01) | |
| *G06N 20/00* | (2019.01) | |
| *G06V 30/40* | (2022.01) | |
| *H04L 9/08* | (2006.01) | |
| *H04L 9/32* | (2006.01) | |
| *H04L 9/00* | (2022.01) | |

(52) U.S. Cl.
CPC .......... *G06F 16/93* (2019.01); *G06F 18/2148* (2023.01); *G06F 18/2185* (2023.01); *G06N 20/00* (2019.01); *G06V 30/40* (2022.01); *H04L 9/085* (2013.01); *H04L 9/0891* (2013.01); *H04L 9/3242* (2013.01); *H04L 9/50* (2022.05)

(56) References Cited

U.S. PATENT DOCUMENTS

| | | | |
|---|---|---|---|
| 2010/0017487 A1 | 1/2010 | Patinkin | |
| 2013/0097103 A1* | 4/2013 | Chari | G06N 20/10 707/E17.089 |
| 2015/0012805 A1* | 1/2015 | Bleiweiss | G06F 40/134 715/205 |
| 2016/0092549 A1 | 3/2016 | Byron et al. | |
| 2016/0232456 A1 | 8/2016 | Jain et al. | |
| 2017/0005804 A1 | 1/2017 | Zinder | |
| 2017/0220815 A1 | 8/2017 | Ansari et al. | |
| 2017/0230189 A1 | 8/2017 | Toll et al. | |
| 2018/0096362 A1 | 4/2018 | Kwan | |
| 2018/0129950 A1* | 5/2018 | Kumar | G06N 20/00 |
| 2018/0241551 A1 | 8/2018 | Fujimura et al. | |
| 2018/0373711 A1* | 12/2018 | Ghatage | G06K 9/6263 |
| 2019/0005125 A1* | 1/2019 | Yoo | G06F 16/38 |
| 2019/0068615 A1 | 2/2019 | Pack et al. | |
| 2019/0340428 A1* | 11/2019 | Wickett | H04L 51/18 |
| 2020/0005032 A1* | 1/2020 | Freed | G06Q 10/10 |
| 2020/0089663 A1 | 3/2020 | Padmanabhan | |

OTHER PUBLICATIONS

Michael Mainelli et al. Sharing Ledgers for Sharing Economies: An Exploration of Mutual Distributed Ledgers (Aka Blockchain Technology). Journal of Financial Perspectives. Nov. 7, 2015, vol. 3, No. 3, pp. 1-47, Available at SSRN: https://ssrn.com/abstract=3083963.

Sawtooth 1.0.5 Documentation, webpage: "Building and Submitting Transactions" [online], Sawtooth, May, 2, 2017 [retrieved Jan. 29, 2022], Retrieved from the Internet: URL(s): https://sawtooth.hyperledger.Org/docs/core/releases/1.0/_autogen/txn_submit_tutorial.html (Year: 2017).

Sawtooth 1.0.5 Documentation, webpage: "Transactions and Batches" [online], Sawtooth, May, 2, 2017 [retrieved Jan. 29, 2022], Retrieved from the Internet: URL(s): https://sawtooth.hyperledger.Org/docs/core/releases/1.0/architecture/transactions_and_batches.html (Year: 2017).

International Search Report & Written Opinion for Application No. PCT/US2019/051860, mailing date Jan. 3, 2020.

Written Opinion of the International Searching Authority, International Application No. PCT/US2019/051860, mailed Jan. 3, 2020.

Notification Concerning Transmittal of Copy of International Preliminary Report on Patentability, International application No. PCT/US2019/051860, mailed Apr. 1, 2021.

International Search Report and Written Opinion for Application No. PCT/US2019/051858, mailing dated Jan. 3, 2020.

\* cited by examiner

DEAL ROOM PLATFORM USING ARTIFICIAL INTELLIGENCE

CROSS-REFERENCE TO RELATED APPLICATIONS

This application claims priority to U.S. Provisional Patent Application Ser. No. 62/733,959 filed Sep. 20, 2018, which is incorporated by reference herein in its entirety.

FIELD

The present disclosure relates to a deal room platform that manages different aspects of document-intensive activities using cognitive processes. The present disclosure further relates to a deal room platform that manages various operations relating to documents that are provided to the deal room platform using a cryptographic ledger, such as blockchain.

BACKGROUND

In today's business climate, there are many different types of complex transactions that occur between parties. They include mergers and acquisitions, financing deals, non-traditional investments (e.g., startup investments), and the like. The activities may be referred to as "document-intensive activities" as these types of transactions require the exchange of hundreds, thousands, or even tens of thousands of documents. The exchange of documents typically occurs during a due diligence period. These due diligence periods require lots of resources, both human and financial, as attorneys, bankers, consultants, and the like, typically review and summarize the documents at high billing rates. These contracted parties may also review the documents to identify potential risks to the party which they represent. Moreover, there is an incentive for a party to conceal documents that paint the party in a negative light or to obscure those documents in a large data dump. Furthermore, as due diligence can take months to complete, the dynamics of a deal may change over the course of the due diligence period. Thus, there is a need for a solution to improve the due diligence process associated with document intensive activities.

As there is an incentive for parties to conceal, remove, or otherwise alter the documents presented during due diligence, there is also a need to be able to audit the activities undertaken by parties during due diligence. Auditing activities may include managing permissions, determining who uploaded what documents, which documents were altered or deleted, and the like. One issue is that parties involved in a deal may be distrustful of one another. Another issue is that traditional software solutions may not log these activities in a manner that provides the adequate amount of trust required for such logs to serve as evidence of those activities, as these logs may be manipulated by malicious users. Thus, there is a need for a solution that intelligently manages and/or log activities occurring on a deal room platform.

SUMMARY

According to some embodiments of the present disclosure, a method for managing documents in an electronic deal room associated with a document-intensive activity is disclosed. The method includes receiving, by a processing system of a deal room platform, a request to upload a document to the electronic deal room from a user device associated with a user participating in the deal. The method further includes receiving, by the processing system, the document from a document source and determining, by the processing system, a classification of the document based on one or more features of the document and a machine-learned document classification model that is trained to classify documents involved in document-intensive activities. The method further includes identifying, by the processing system, one or more folders of an organizational structure having a plurality of folders corresponding to the electronic deal room based on the classification, and associating, by the processing system, the document with the one or more folders.

In embodiments, the machine-learned classification model is trained on a plurality of training data sets, each training data set including one or more documents. In some of these embodiments, each training data set includes at least one labeled document, wherein the label indicates a respective classification of the labeled document. In some of these embodiments, one or more training data sets of the plurality of training data sets are obtained from historical data associated with the deal room platform. Furthermore, the historical data may include classifications of previously uploaded documents that were uploaded to the deal room platform in connection with other deals. In some embodiments, one or more training data sets of the plurality of training data sets are obtained from an expert that labeled the at least one labeled document of each of the one or more training data sets. In some embodiments, a training data set of the plurality of training data sets includes feedback data relating to a previous classification of a previously uploaded document that was classified by the system, wherein the feedback data is used to reinforce the machine-learned classification model. In some embodiments, the machine-learned classification model is trained using a training data set of the plurality of training data sets that includes one or more unlabeled documents. In some of these embodiments, the method includes training the machine-learned classification model based on the one or more unlabeled documents and one or more labeled documents, wherein each respective labeled document is labeled with a respective classification of the respective labeled document. In some of these embodiments, training the machine-learned classification model includes clustering the one or more unlabeled documents with the one or more labeled documents based on respective features of the one or more unlabeled documents and the one or more labeled documents to determine respective classifications of the unlabeled documents. In some of these embodiments, the method further includes training the machine-learned classification model based on respective results of natural language processing of each document in the plurality of training data sets.

In embodiments, embodiments, the deal is one of a merger, an acquisition, a financing, or an investment round.

In embodiments, the machine-learned classification model classifies different types of contracts associated with a type of the deal.

In embodiments, the machine-learned classification model classifies different types of non-contractual documents associated with a type of the deal.

In embodiments, the method further includes identifying, by the processing system, one or more content segments of the document. Furthermore, for each content segment, the method includes extracting, by the processing system, one or more features of the content segment; and determining, by the processing system, a content classification of the content segment based on the one or more features of the content segment and a machine-learned content extraction and classification model that is trained to identify one or more different types of content segments. In some of these embodiments, the classification of the document is based at least in part on at least one of the content classifications. In some embodiments, the method further includes generating an advisory memo using a natural language generation system based on a content classification corresponding to one of the content segments. In some of these embodiments, the advisory memo includes a location in the document where the content segment to which the content classification corresponds is located. In some of these embodiments, the advisory memo includes the content segment to which the content classification corresponds.

According to some embodiments of the present disclosure, a method for predicting risk associated with a deal being hosted in an electronic deal room is disclosed. The method includes maintaining, by a processing system of a deal room platform, a plurality of uploaded documents in an organizational structure corresponding to the electronic deal room. The method further includes extracting, by the processing system, a set of features corresponding to the plurality of uploaded documents. The method further includes obtaining, by the processing system, a risk prediction from a machine-learned risk prediction model based on the set of features and providing, by the processing system, the risk prediction to a user.

In embodiments, the method further includes generating, by the processing system, a risk assessment memo based on the risk prediction, wherein the risk assessment memo indicates the risk prediction. In some of these embodiments, the method further includes storing, by the processing system, the risk assessment memo in the organizational structure. In embodiments, providing the risk prediction includes transmitting the risk assessment memo to the user via a user device.

In embodiments, the machine-learned risk prediction model is trained on a plurality of training data sets, wherein each training data set corresponds to a respective previous deal and includes a set of one or more training documents and an outcome associated with the deal that is at least partially based on the set of one or more training documents. In some of these embodiments, one or more training data sets of the plurality of training data sets are obtained from historical data associated with the deal room platform. In some embodiments, the historical data contained in a respective training data set of the one or more training data sets includes a previously recorded outcome of a previously hosted deal that is at least partially based on the one or more previously uploaded documents that were uploaded in connection with the previously hosted deal. In some embodiments, one or more training data sets of the plurality of training data sets are obtained from an expert review of the one or more training documents in the training data sets by an expert, and wherein each outcome in the one or more training data sets is provided by the expert. In some embodiments, a training data set of the plurality of training data sets includes feedback data relating to a previous outcome of a previously performed deal that was hosted on the data room platform, wherein the previous outcome is at least based on part on previously uploaded documents that were uploaded in connection with the previously performed deal. In some embodiments, the training data set of the plurality of training data sets further includes a previous risk prediction output by the machine-learned risk prediction model in response to an extracted set of features of the previously uploaded documents. In some embodiments, the outcome included in a respective training data set of the plurality of training data sets indicates whether the respective previous deal was successful or unsuccessful. In some embodiments, the outcome included in a respective training data set of the plurality of training data sets indicates a substantive issue that arose in during the respective previous deal. In some embodiments, the issue is one of a litigation risk, an executive buyout clause, a risk of insufficient funds, or an instance of inconsistent financial information. In embodiments, the machine-learned risk prediction model is trained to identify substantive risks associated with a hosted deal based on one or more documents uploaded in connection with the hosted deal. In some embodiments, the outcome included in a respective training data set of the plurality of training data sets indicates one or more types of documents that were deemed missing during the respective previous deal. In some of these embodiments, the machine-learned risk prediction model is trained to identify type of documents that are likely missing from a hosted deal based on one or more documents uploaded in connection with the hosted deal. In some embodiments, the outcome included in a respective training data set of the plurality of training data sets indicates one or more specific documents that were determined to be missing during the respective previous deal. In embodiments, the machine-learned risk prediction model is trained to identify specific documents that are likely missing from a hosted deal based on one or more documents uploaded in connection with the hosted deal.

In embodiments, the deal is one of a merger, an acquisition, a financing, or an investment round.

According to some embodiments of the present disclosure, a method for managing documents in an electronic deal room associated with a document-intensive activity is disclosed. The method includes receiving, by a processing system of a deal room platform, a request to upload a document to the electronic deal room from a user device associated with a user participating in the deal. The method also includes receiving, by the processing system, an uploaded document from a document source in response to the request. The method further includes determining, by the processing system, a classification of the uploaded document based on one or more features of the uploaded document and a machine-learned document classification model that is trained to classify documents involved in document-intensive activities, wherein the machine-learned model is trained on a plurality of training data sets that are generated from historical data provided during previous deals hosted on the deal room platform, and wherein a training data set of the plurality of training data sets includes a historical document provided during a previous deal and a historical classification of the historical document. The method also includes receiving, by the processing system, feedback data relating to the classification of the uploaded document, wherein the feedback data either indicates a verification or a contradiction of the classification of the uploaded document. The method further includes generating, by the processing system, a new training data set based on the uploaded document, the classification of the uploaded document, and the feedback data. The method also includes retraining, by the processing system, the machine-learned classification model based on the plurality of training data sets and the new training data set to obtain an updated classification model. The method further includes storing, by the processing system, the updated classification model in a model datastore, wherein the updated classification model is used to classify subsequently received documents.

In embodiments, the method further includes identifying, by the processing system, one or more folders of an organizational structure having a plurality of folders corresponding to the electronic deal room based on the classification, and associating, by the processing system, the uploaded document with the one or more folders.

In embodiments, each training data set includes at least one labeled document, wherein the label indicates a respective classification of the labeled document. In some of these embodiments, the machine-learned classification model is trained using a training data set of the plurality of training data sets that includes one or more unlabeled documents. In some of these embodiments, the method further includes training the machine-learned classification model based on the one or more unlabeled documents and one or more labeled documents, wherein each respective labeled document is labeled with a respective classification of the respective labeled document. In some embodiments, training the machine-learned classification model includes clustering the one or more unlabeled documents with the one or more labeled documents based on respective features of the one or more unlabeled documents and the one or more labeled documents to determine respective classifications of the unlabeled documents.

In embodiments, retraining the machine-learned classification model is further based on respective results of natural language processing of the uploaded document.

In embodiments, the deal is one of a merger, an acquisition, a financing, or an investment round.

In embodiments, the machine-learned classification model classifies different types of contracts associated with a type of the deal.

In embodiments, the machine-learned classification model classifies different types of non-contractual documents associated with a type of the deal.

In embodiments, the method further includes identifying, by the processing system, one or more content segments of the document, and for each for each content segment: extracting, by the processing system, one or more features of the content segment; and determining, by the processing system, a content classification of the content segment based on the one or more features of the content segment and a machine-learned content extraction and classification model that is trained to identify one or more different types of content segments. In some of these embodiments, the classification of the document is based at least in part on at least one of the content classifications. In some of these embodiments, further comprising generating an advisory memo using a natural language generation system based on a content classification corresponding to one of the content segments. In some of these embodiments, wherein the advisory memo includes a location in the document where the content segment to which the content classification corresponds is located. In some embodiments, wherein the advisory memo includes the content segment to which the content classification corresponds.

In some embodiments of the present disclosure, a method for managing a deal room using a cryptographic ledger that includes a plurality of blocks that store information relating to a deal being hosted in the deal room is disclosed. The method includes receiving, by a processing system, a request to perform an operation with respect to the deal room from a remote computing device, wherein the request is indicative of a user that is requesting permission to perform the operation and an operation specific permission key corresponding to the user. The method further includes determining, by the processing system, a cryptographic hash of the operation specific permission key using a hash function. The method also includes transmitting, by the processing system, the cryptographic hash to a plurality of node computing device, wherein each node computing device stores at least a portion of the cryptographic ledger, and wherein the cryptographic ledger in part stores cryptographic hashes of operation specific permission keys that indicate permissions granted to respective users associated with the deal. The method further includes receiving, by the processing system, zero or more verification votes of the cryptographic hash from zero or more respective node computing devices of the plurality of node computing devices. The method also includes determining, by the processing system, whether to grant permission to the user to perform the operation based on the zero or more verification votes. In response to determining to grant permission to the user to perform the operation, the method includes allowing, by the processing system, the user to perform the operation; generating, by the processing system, a new state change event record corresponding to the operation, the new state change event record indicating the operation that was performed, the user identifier of the user, a timestamp, and a previous cryptographic hash that indicates a previously generated state change event record; generating, by the processing system, a new block based on the new state change event record using the hash function; and transmitting, by the processing system, the new block to the plurality of node computing devices, wherein at least a subset of the plurality computing nodes add the new block to the cryptographic ledger in response to verifying the new block.

In embodiments, verifying the new block is based on confirming the previous cryptographic hash.

In embodiments, the request to perform an operation is a request to one of upload a new document, view a previously uploaded document, download a previously uploaded document, amend a previously uploaded document, or delete a previously uploaded document.

In embodiments, the request to perform an operation is a request to one of provide a new user with access to the deal room, provide a specific permission to the new user with respect to a document, and revoke a specific permission from a previously added user.

In embodiments, the cryptographic ledger provides an encrypted log of all operations performed with respect to the deal on the deal room.

In embodiments, the cryptographic ledger is a blockchain. In some of these embodiments, each block in the cryptographic ledger is a cryptographic hash of a single respective state change event record and a respective block identifier of a previously stored block. In some of these embodiments, each block in the cryptographic ledger is a cryptographic hash of a plurality of respective state change event records and a respective block identifier of a previously stored block.

In embodiments, the plurality of node computing devices form a federated network.

In embodiments, the operation specific permission key is a service-specific permission key that corresponds to a service that is generated by the processing system and assigned to the user to access the system. In some of these embodiments, the service-specific permission key is stored in a previously generated block in the cryptographic ledger and a copy of the previously generated block is stored by an agent executing on a computing device associated with the user.

According to some embodiments of the present disclosure, a method for generating an operational log of a deal that is hosted in an electronic deal room that allows users to perform operations relating to the deal is disclosed. The method includes maintaining, by a processing system of a deal room platform that hosts the deal in an electronic deal room, a cryptographic ledger corresponding to the deal, wherein the cryptographic ledger includes a plurality of blocks, and wherein each of the plurality of blocks includes a hash value of one or more change state event records and a block identifier that identifies another block stored on the cryptographic ledger. The method also includes establishing communication with a plurality of other node computing devices, wherein each of the plurality of other node computing devices stores a respective copy of at least a portion of the cryptographic ledger. The method also includes receiving, by the processing system, a request to perform a requested operation with respect to the deal from a user. The method also includes allowing, by the processing system, the user to perform the requested operation in the electronic deal room. The method further includes, generating, by the processing system, a new state change event record that indicates performance of the requested operation. The method also includes generating, by the processing system, a new block based on the new state change event record and a block identifier of another block of the plurality of blocks using a cryptographic hash function. The method also includes updating, by the processing system, the cryptographic ledger by: adding new block to the plurality of blocks to obtain a new plurality of blocks; and transmitting the new block to one or more of the plurality of node computing devices, such that each of the one or more node computing devices may store the new block in the respective copy of the cryptographic ledger of the node computing device. The cryptographic ledger may be solved by the processing system and/or the one or more of the plurality of node computing devices to obtain the operational log of the deal that includes the new state change event record.

In embodiments, solving the updated cryptographic ledger includes: solving a first block of the plurality of blocks to identify a solution of the first block that contains one or more stored state change event records and a first block identifier of a second block of the plurality of blocks; verifying the solution of the first block based on the first block identifier; and in response to verifying the solution of the first block, beginning to solve the second block. In some of these embodiments, verifying the solution of the first block includes: transmitting a proof of work to other node computing devices of the plurality of devices, wherein the proof of work indicates the first block identifier; receiving one or more respective verification vote that verifies the proof of work from at least a subset of the other node computing devices; and selectively verifying the solution of the first block based on the respective verification votes. In some embodiments, each respective node computing device of the subset of the other node computing devices receives the proof of work and transmits a verification vote confirming the proof of work in response to determining that the first block identifier included in the proof of work corresponds to a block identifier of a block contained in the local copy of the cryptographic ledger stored at the respective node computing device. In some embodiments, the second block is a block that was added to the plurality of blocks prior to when the first block was added to the updated cryptographic ledger.

In embodiments, the requested operation is to one of uploading a new document to the electronic deal room, viewing a previously uploaded document, downloading a previously uploaded document, amending a previously uploaded document, or deleting a previously uploaded document.

In embodiments, the requested operation is providing a new user with access to the deal room, providing a specific permission to the new user with respect to a document, and revoking a specific permission from a previously added user.

In embodiments, the cryptographic ledger is a blockchain. In some of these embodiments, each block in the cryptographic ledger is a cryptographic hash of a single respective state change event record and a respective block identifier of a previously stored block. In some embodiments, each block in the cryptographic ledger is a cryptographic hash of a plurality of respective state change event records and a respective block identifier of a previously stored block.

In embodiments, the plurality of node computing devices form a federated network.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings.

DETAILED DESCRIPTION

Figure 1:
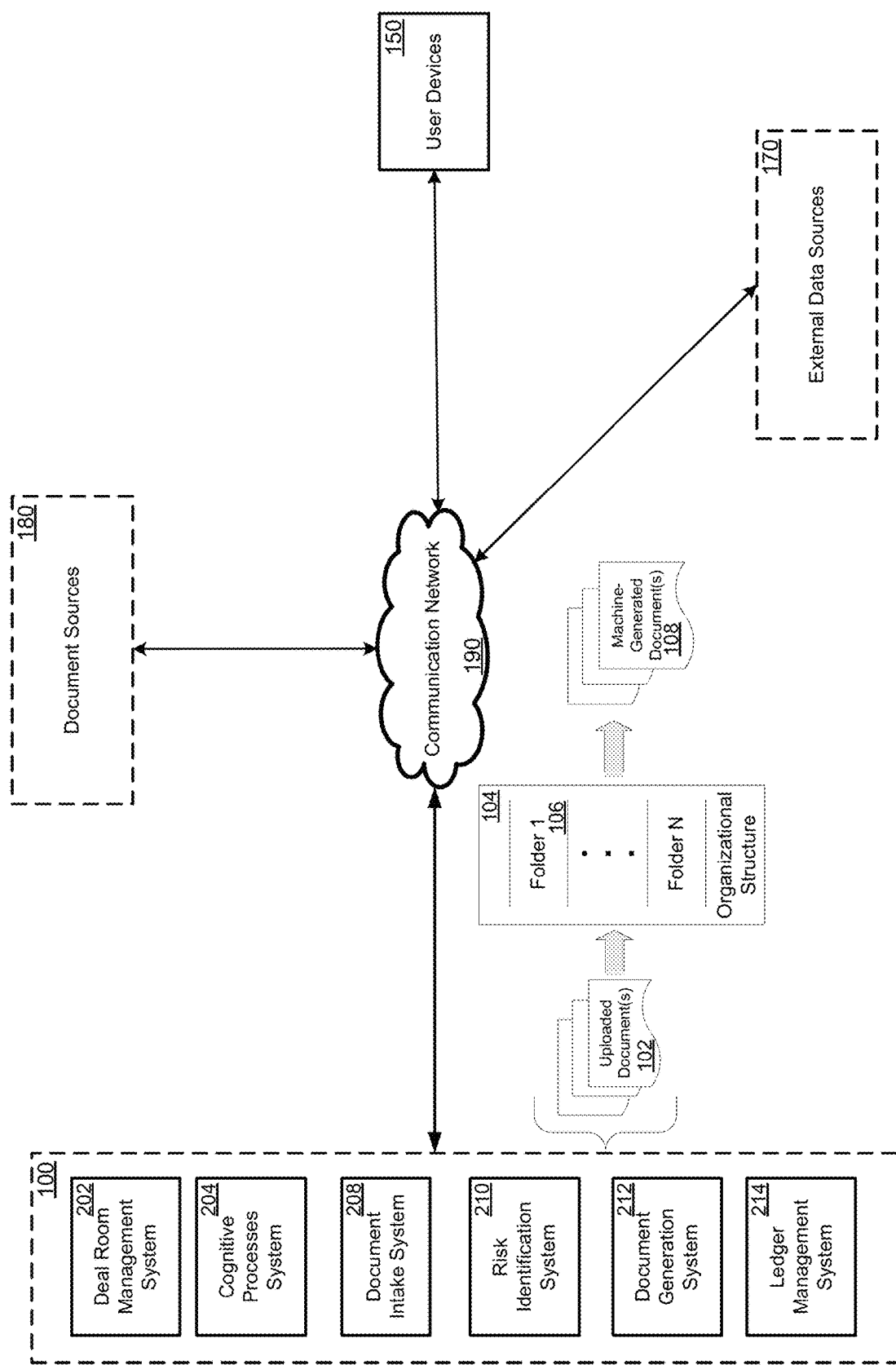
FIG. 1 is a schematic illustrating an example environment of a deal room platform according to some embodiments of the present disclosure.

FIG. 1 illustrates an example environment 10 of a deal room platform 100 according to some embodiments of the present disclosure. In embodiments, a deal room platform 100 is a collection of one or more servers that allows third parties to conduct transactions or other document-intensive activities in a shared, secured workspace. Put another way, the deal room platform 100 may be configured to allow the secure distribution and exchange of information in a multi-party content-centric transaction. For example, in a merger, acquisition, or financing deal, parties may include one or more buyers, sellers, or investors. For ease of explanation, an investor may also be referred to as a buyer and a party seeking investment may be referred to as a seller. In this example, representatives (e.g., employees, bankers, attorneys, and the like) of the buyer(s) and representatives of the seller(s) may provide, view, edit, or otherwise interact with the deal room platform 100 to negotiate the transaction (e.g., a merger, acquisition, financing, and the like). The representatives access the server using a client user device 150. In operation, the deal room platform 100 instantiates a virtual deal room for a new deal.

In embodiments, a virtual deal room (or "deal room") is a sandboxed collaborative workspace which can only be accessed by users to which permission is granted (e.g., users associated with a deal). Each deal room corresponds to a respective document-intensive activity (e.g., transaction or deal). Once connected to the virtual deal room, representatives of a party (e.g., attorneys or employees of the sellers and/or buyers) can upload documents 102. Documents 102 may be uploaded individually or in batches. In embodiments, the documents 102 may be obtained from any suitable document source 180. Examples of document sources 180 may include client user devices 150, data servers associated with a party to the document-intensive activity (e.g., a data server of a potential buyer or seller), publicly available services, governmental databases, websites, and the like. As used herein, a document may refer to any suitable file that contains content. The content in a document may be textual and/or non-textual. For example, a document may contain text, code, audio, images, pdfs, videos, 3D videos, and the like. While many of the examples embodiments described herein describe techniques with respect to non-textual documents as well.

In embodiments, the deal room platform 100 implements cognitive processes, such as machine-learning, artificial intelligence, natural language processing, and/or natural language generation. The deal room platform 100 may utilize one or more cognitive processes to classify uploaded documents 100, to organize the classified uploaded documents 102 into an organizational structure 104, to create machine-generated documents 108 from of groups of one or more uploaded documents 102, and/or to identify parties interested in transacting with a party associated with incoming documents (e.g., finding a buyer, seller, or investor).

In embodiments, the deal room platform 100 utilizes cognitive processes to classify uploaded documents 102 and to organize the classified uploaded documents 102 with respect to an organizational structure 104. An organizational structure 104 may refer to a file system that is specific to a document-intensive activity (e.g., a merger, an acquisition, an investment round, a due diligence project, etc.), where there are specific folders 106 for specific types of documents. For example, in a merger or acquisition, the organizational structure 102 may include folders 106 that are associated with employment contracts, executive stock options, insurance documents, cease and desist letters, customer contracts, and the like. In operation, the deal room platform 100 may receive a document 102 or batch of documents 102. The deal room platform 100 may implement natural language processing and/or a classification model (e.g., a neural network or regression-based model) to classify the document(s) 102 and/or may cluster the document(s) 102 with a corpus of classified documents to determine a likely classification of the uploaded document(s). For example, the deal room platform 100 may receive a document 102 and classify the document as an employment contract or an executive stock option based on the contents of the document 102 itself. In response to classifying a document 102, the deal room platform 100 may associate the classified document 102 with one or more suitable folders 106 of the organizational structure 104 based on the classification. As used herein, the term associating a document with one or more folders 106 may include one or more of creating a logical link or relationship between each document and the one or more respective folders 106 and/or storing each document in one or more of the respective folders 106 in a file system. In this way, the amount of time required to setup a transaction can be reduced by 2-4 weeks and costly errors in classifying data may be avoided. In embodiments, the data room platform 100 may train models used for classification using historical data relating to previous document-intensive activities. For example, historical data relating to previously administered mergers and acquisitions may be used to train models used to classify documents in mergers and acquisitions.

In embodiments, the deal room platform 100 may be configured to generate machine-generated documents 108 based on other documents stored in the organizational structure 104. For example, in the case of a merger or acquisition deal, the deal room platform 100 may analyze documents associated with one or more specific folders 106 and may generate an advisory memo based on the contents of the documents. An advisory memo may be a document that indicates one or more items of interest in a group of documents. For example, with respect to an advisory memo relating to executive stock options, the deal room platform 100 may analyze every executive stock option document and may generate an advisory memo that indicates each person in an organization with a stock option, a number of shares allocated by each stock option, and a vesting schedule for each stock option. In this example, the deal room platform 100 may be trained to identify and extract specific types of contract provisions or other specific sections of particular types of documents (e.g., language relating to granted stock options and vesting schedules) and may utilize natural language generation to generate the advisory memo. In another example, with respect to an advisory memo relating to a software review, the deal room platform 100 may analyze any code that was uploaded to the deal room platform and may generate an advisory memo that indicates a degree to which the code contains documentation, potential security issues identified in the code, and instances where open source code is detected and a license under which the open source code was licensed. In this example, the deal room platform 100 may retrieve each piece of updated code and may analyze the code using a model trained to identify open source code. If the deal room platform determines that the code is open source code, the deal room platform 100 may determine a likely license under which the code is licensed. Additionally or alternatively, the deal room platform 100 may be configured to analyze the code to determine a degree to which the code contains documentation using a model that is trained to analyze code for documentation. Additionally or alternatively, the deal room platform 100 may analyze the code for security risks using a model trained to identify security risks. The deal room platform 100 may then generate an advisory memo relating to the code based on the results of the analyses performed on the code using natural language generation techniques. The deal room platform 100 may generate other types of documents as well. For example, the deal room platform 100 may be configured to generate risk assessment memos, which indicate potential risks associated with the deal and/or documents that may be missing. As used herein, the term risk may be an assessment of whether a deal is likely to be successful or unsuccessful, particular issues that may arise with respect to the deal based on the content of the documents and/or data derived from one or more external data sources, and/or one or more gaps in a set of documents (e.g., types of documents that are likely missing from a document set or particular documents that might be missing from a document set). Greater discussion pertaining the manner by which risk may be defined and represented is provided in this disclosure below. Furthermore, as used herein, the term "memo" (e.g., as used in connection with risk assessment memo or advisory memo) may refer to any suitable format of written content, including but not limited to formal reports, outlines, bulleted items, and the like.

In embodiments, the deal room platform 100 may output notifications in addition to or in lieu of generating a memo. In some embodiments, the deal room platform 100 may issue a notification to a user of a classification of one or more documents. For example, the deal room platform 100 may provide a notification of a classification to a user device 150 of a user that uploaded the documents and/or other users associated with the deal (e.g., a user that is tagged to review documents of a particular type, a user that has requested to view documents of a particular type, an administrator, an auditor, and the like).

In embodiments, the deal room platform 100 may output classifications of documents in a graphical user interface (e.g., a dashboard). In embodiments, for each document that is classified, the deal room platform 100 may output the classification via a graphical user interface. In some of these embodiments, the classification and/or the title of the document may be displayed in a manner that conveys a degree of confidence in the classification. For example, the document may be displayed with full opacity if the degree of confidence in the classification is high (e.g., higher than a threshold), but may be displayed in varying degrees of transparency when the degree of confidence decreases (e.g., the more transparent the classification and/or title is shown, the less the degree of confidence).

In embodiments, the deal room platform 100 may be configured (e.g., trained) to identify risks associated with a document-intensive activity. For example, the deal room platform 100 may train one or more prediction models using documents from successful transactions and documents from transactions having one or more issues. The documents may be labeled as belonging to a successful transaction or to an unsuccessful transaction. In embodiments, when the deal room platform 100 identifies a training data set (e.g., a document set and related labels) relating to an unsuccessful deal, the deal room platform 100 may label the data set with the one or more issues that arose out of the transaction (e.g., litigation risk, improper title to real or intellectual property, insufficient funding, missing documents, and the like). In some of these embodiments, the issues may be objectives that were not met. The deal room platform 100 may train one or more models using the data sets (e.g., document groups). When a new transaction is being performed and documents are uploaded to the deal room platform 100, the deal room platform 100 may leverage the one or more prediction models to identify risks corresponding to the new transaction based on the provided documents. The risks may be specific to a party (e.g., the buyer or seller). For example, the risks may whether one or more buyer objectives or one or more seller objectives are not likely to be met. In embodiments, the risks may be conveyed to the users in a risk assessment memo that is generated by the deal room platform 100. Additionally or alternatively, risk may be conveyed to a user via alerts, notifications, and/or via a graphical user interface (e.g., a dashboard).

In some embodiments, the deal room platform 100 may provide a notification of one or more risks associated with the deal. In some of these embodiments, the deal room platform 100 may provide a notification of an identified risk to a user device of a user associated with the deal (e.g., a user who updated a particular document, a user that is tagged to review documents of a particular type, a user that has requested to view documents of a particular type, an administrator, an auditor, and the like).

In embodiments, the deal room platform 100 may output predictions relating to identified risks in a graphical user interface (e.g., a dashboard). In embodiments, for each risk that is predicted by the deal room platform, the deal room platform 100 may output the prediction via a graphical user interface. In some of these embodiments, the prediction may be displayed in a manner that conveys a degree of confidence in the prediction. For example, the document may be displayed with full opacity if the degree of confidence in the classification is high (e.g., higher than a threshold), but may be displayed in varying degrees of transparency when the degree of confidence decreases (e.g., the more transparent the classification and/or title is shown, the less the degree of confidence).

In embodiments, the deal room platform 100 may assign permissions to the document within an organizational structure, such that the deal room platform 100 may allow or disallow a document from being edited, downloaded, deleted, and the like. In embodiments, the deal room platform 100 may also assign certain rights to certain users. For example, the deal room platform 100 may allow certain users to edit or delete documents but may prohibit others from editing or deleting documents. In another example, the deal room platform 100 may allow certain parties to view certain documents, while other parties may be prohibited from viewing the certain documents. Permissions may be assigned by a user and/or may be assigned using artificial intelligence processes. In the latter scenario, a user may have certain credentials, and the deal room platform 100 may determine whether to grant access to the user based on those credentials and/or external data relating to the user.

In embodiments, the deal room platform 100 may receive data from one or more external data sources 170 to aid in predictions and/or classifications. External data sources may include social networking platforms (e.g., Facebook®, LinkedIn®, and the like), company websites, governmental websites (e.g., the United States Patent and Trademark Office, the Securities and Exchanges Commission, the Department of Justice, court websites, and the like), blogs, ratings platforms (e.g., Glassdoor® and the like). The deal room platform 100 may structure this data and may use the data (structured and/or unstructured) to make predictions and/or classifications.

In embodiments, the deal room platform 100 may implement a cryptographic ledger to manage one or more aspects of a document-intensive activity. The cryptographic ledger may be any suitable type of cryptographic ledger, such as a blockchain (e.g., Hyperledger, Solidity, Etherium, and the like). The cryptographic ledger may be distributed or centralized. In embodiments, a private network of authorized participants may establish cryptography-based consensus on one or more items. In this way, the deal room platform 100 may provide security, transparency, auditability, immutability, and non-repudiation to negotiated transactions and other documents. Private network of authorized participants may establish cryptography-based consensus. In embodiments, the deal room platform 100 (or another trusted authority) may issue private key and public key pairs to each registered user. These private key/public key pairs may be used to encrypt and decrypt messages, as well as to perform operations with respect to the cryptographic ledger. In embodiments, the deal room platform 100 may provide two or more levels of access, whereby a first class of users may have the ability to vote/validate actions for the purposes of obtaining consensus with respect to an operation performed by the ledger, and a second class that does not have voting rights. Possession of certain keys may be used to determine a level of access to the cryptographic ledger, where the first class of users may be granted full viewing access of a block, while the second class of users may be only able to verify claims.

In embodiments, the deal room platform 100 may utilize the cryptographic ledger to manage permissions to documents, create an archive of the transaction (e.g., an immutable record of which documents were provided, altered, and/or deleted), validate pre-closing and closing work, and/or provide a framework for smart contracts. In embodiments, the deal room platform 100 may use the cryptographic ledger to create an archive of a document-intensive activity.

Figure 2:
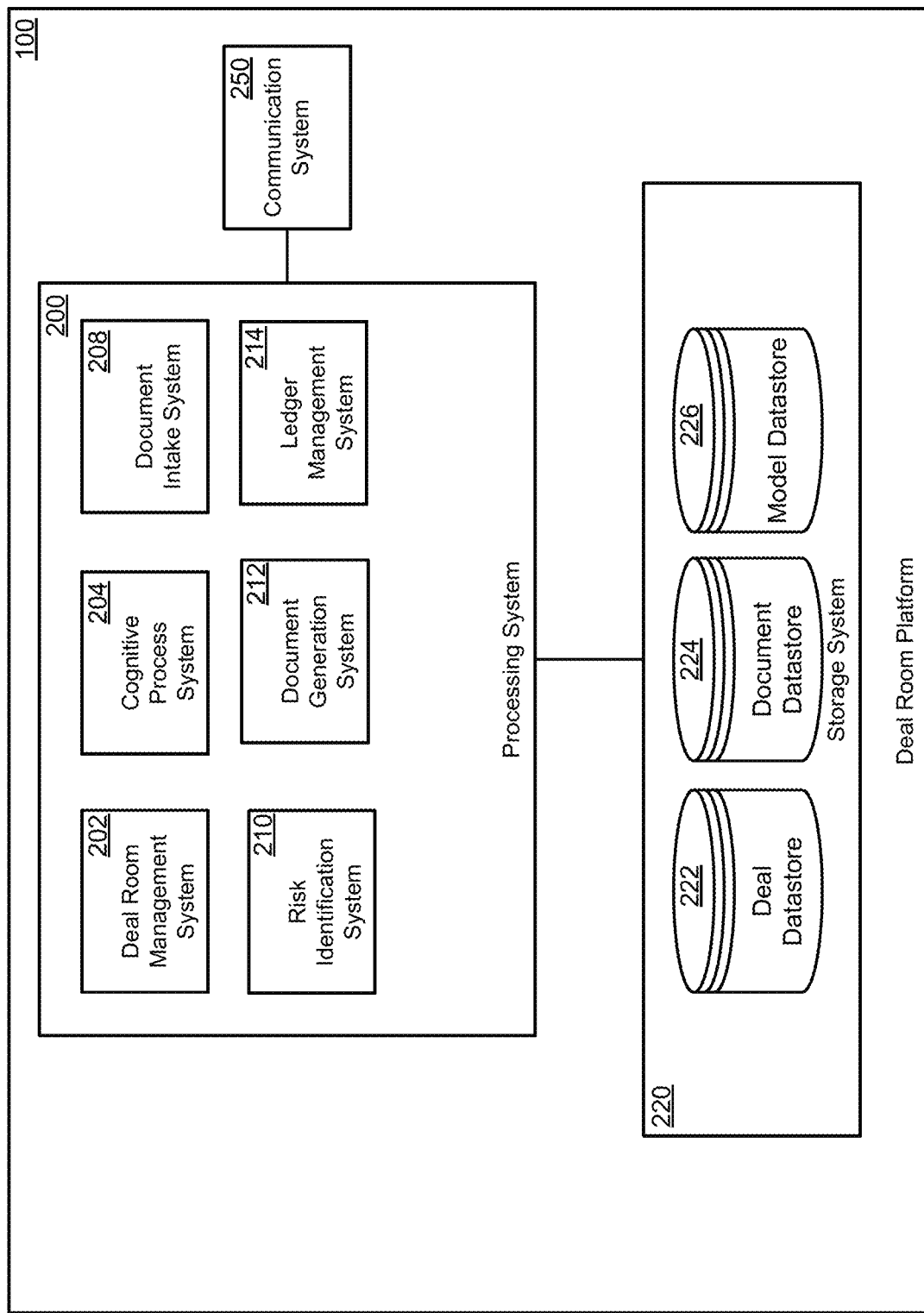
FIG. 2 is a schematic illustrating an example set of components of the deal room according to some embodiments of the present disclosure.

FIG. 2 illustrates an example configuration of a deal room platform 100 and the components thereof. In the illustrated example, the deal room platform 100 includes a processing system 200, a storage system 220, and a communication system 250. The deal room platform 100 can include other components without departing from the scope of the disclosure.

The processing system 200 may include one or more processors and memory. The processors may operate in an individual or distributed manner. The processors may be located in the same physical device and/or location or may be distributed across multiple devices and/or locations. The memory may store computer-executable instructions that are executed by the one or more processors. In embodiments, the processing system 200 may execute, inter alia, a deal room management system 202, a document intake system 204, a cognitive processes system 208, a risk management system 210, a document generation system 212, and a ledger management system 214. The processing system 200 may execute additional or alternative systems without departing from the scope of the disclosure.

The communication system 250 may include one or more transceivers that are configured to effectuate wireless or wired communication with one or more external devices. The communication system 250 may implement any suitable communication protocol. The communication system 250 may implement, for example, an IEEE 801.11 wireless communication protocol and/or any suitable cellular communication protocol to effectuate wireless communication with external devices via a wireless network. The communication system 220 may implement wired communication protocols, such as suitable LAN protocols.

The storage system 220 may include one or more computer-readable storage mediums. Computer-readable storage mediums may include flash devices, solid-state memory devices, hard disk drives, and the like. The storage mediums may be located in the same physical device and/or location or may be distributed across multiple devices and/or locations. In embodiments, the storage system 220 may store, inter alia, a deal datastore 222, a document datastore 224, and a model datastore 228.

In embodiments, the deal datastore 222 stores data regarding respective deals and deal rooms. The deal datastore 222 may store data relating to respective document-intensive activities that are being or have been hosted by the deal room platform 100. For each deal, the deal datastore 222 may store a deal identifier that identifies the deal from other deal (i.e., identifies different deal rooms), identifiers of parties that are participating in the deal, users that have permission to access the deal room, an identifier of the organizational structure associated with the deal room, and any other suitable data relating to the deal room (e.g., creation date, target dates, and/or a log of activities occurring in the deal).

In embodiments, the document datastore 224 stores documents and data relating thereto. In embodiments, the document datastore 224 may store organizational structures, where each organizational structure corresponds to a respective deal. In embodiments, the document datastore 224 may include one or more databases, tables, indices, and the like. Furthermore, the document datastore 224 may store metadata relating to each document. For example, the document datastore 224 may include metadata that indicates when a document was added to the datastore 224, a user who uploaded the document, when a document was edited, who edited the document, the permissions relating to a document, when a document was deleted, a user who deleted the document, and the like. The document datastore 224 may store additional or alternative data as well.

The model datastore 226 may store models that are used by the deal room platform 100. Each model may include a model identifier, whereby the model identifier uniquely identifies the model from other models. As will be discussed, the deal room platform 100 may train and/or maintain one or more machine-learned models that are used for various applications of the platform 100.

In embodiments, the deal room management system 202 creates and manages respective deal rooms. As discussed, each deal room may be a respective sandboxed collaborative workspace corresponding to one or more document-intensive activities, such as M&A work, due diligence work, financing work, investments, litigation matters, and the like. A deal room may allow collaboration from users corresponding to one or more parties (e.g., organizations, individuals, companies, non-profits, and the like). A user corresponding to a party may request the creation of a new deal room relating to a new activity. For example, a user may request the creation of a deal room for an acquisition of a company with which the user is associated. In response to the request, the deal room management system 202 instantiates a new deal room. In embodiments, the deal room management system 202 may create a record of users that may access the new deal room (e.g., a list of email addresses). In embodiments, the deal room management system 202 may create an organizational structure 104 corresponding to the type of the deal. The organizational structure 104 may include a set of predetermined folders corresponding to a predefined hierarchy. For example, for an organizational structure 104 corresponding to the acquisition, the hierarchy may include high level folders relating to offers, contracts, litigation notices, property, organizational documents, and the like.

In embodiments, the deal room management system 202 may manage permissions and tracking of user activities with respect to each deal room. As different users upload, access, edit, or delete documents in the organizational structure of a particular deal room, the deal room management system 202 may maintain a log of metadata surrounding such actions, including a user id of a user performing the action, a type of action performed, a document to which the action relates, a timestamp corresponding to a time at which the action was performed, and the like. Additionally or alternatively, such actions may be tracked and performed using a cryptographic ledger.

The deal room management system 202 may perform additional or alternative functions, processes, and/or operations relating to the management of respective deal rooms not herein discussed.

Figure 3:
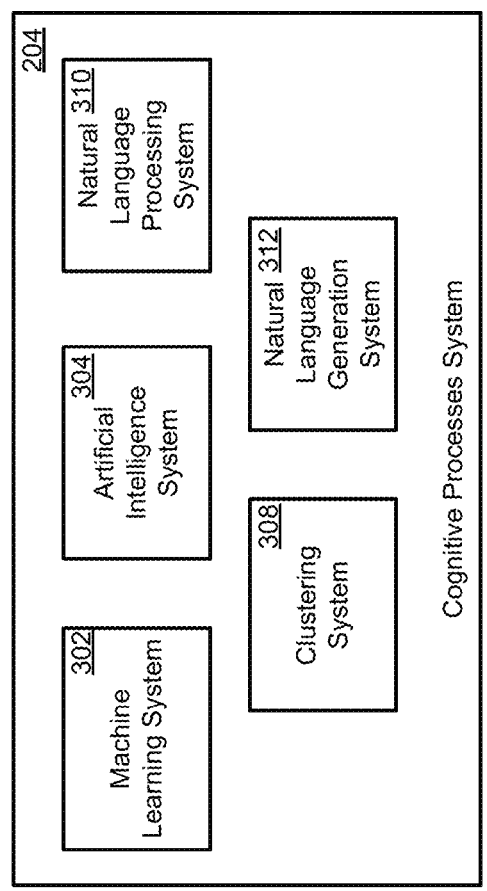
FIG. 3 is a schematic illustrating an example set of components of a cognitive processes system of the deal room according to some embodiments of the present disclosure.

The cognitive processes system 204 includes one or more cognitive systems that are used to automate various tasks that are performed by the deal room platform 100. For example, FIG. 3 illustrates one or more cognitive systems that may be implemented by the deal room platform 100. In embodiments, the cognitive processes system 204 may include a machine learning system 302, an artificial intelligence system 304, a clustering system 308, a natural language processing system 310, and/or a natural language generation system 312. The cognitive processes system 204 may include additional or alternative cognitive systems and/or subsystems.

In embodiments, the machine learning system 302 trains various different types of machine-learned models (or "models") that are used by the deal room platform 100. The machine learning system 302 may employ supervised, semi-supervised, and unsupervised training techniques to train the models. The classification models 402 may be any suitable type of model, including a regression based model, a decision tree model, a neural network, a convolutional neural network, a deep neural network, a feed forward neural network, and the like. Initially, the machine learning system 302 may utilize a predefined base model or a randomized base model to begin the training. The machine learning system 302 may then iteratively train the base model using training data until the model converges with respect to one or more error conditions. The machine learning system 302 may receive training data sets, which may be labeled or unlabeled. The training data sets may correspond to historical data collected by the deal room platform 100 (e.g., outcomes of previously performed deals and the documents exchanged in those deals) and/or expert provided data that is generated for purposes of training a model (human-generated and/or machine-generated) that is labeled by one or more experts. Furthermore, in embodiments the machine learning system 302 may utilize feedback data with respect to a prediction, classification, or other outcome received with respect to a particular model to reinforce a particular model, whether trained using historical data or generated data.

In embodiments, the machine learning system 302 may perform one or more analytical processes on the training data, including feature extraction, deduping data, stitching data, and the like. The machine learning system 302 may perform any suitable feature extraction techniques, including but not limited to principle component analysis (PCA), linear discriminant analysis (LDA), nonlinear discriminant analysis (NDA), SAMANN, and the like. The machine learning system 302 may then generate feature vectors for each respective instance of training data. The machine learning system 302 may then iteratively train the model based on the collection of feature vectors until the model is said to converge on one or more error conditions.

Figure 4:
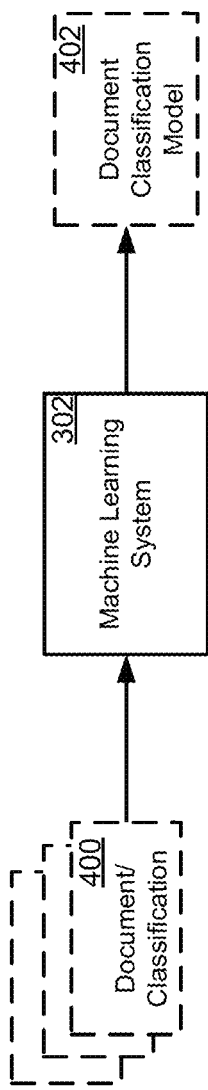
FIG. 4 is a schematic illustrating an example method and system for training a document classification model according to some embodiments of the present disclosure.

In embodiments, the machine learning system 302 trains classification machine-learned models (or "classification models" or "document classification models") that are used to classify documents. For example, FIG. 4 illustrates an example of the machine learning system 302 training a classification model 402 based on training data sets 400 that includes documents, and in some cases, classifications of the documents. The classification models 402 may be any suitable type of model, including a regression based model, a decision tree model, a neural network, a convolutional neural network, a deep neural network, a feed forward neural network, and the like. The classification models 402 can be trained to identify a specific type of document or can be more general in that a single classification model 402 can classify many different types of documents.

In embodiments, the machine learning system 302 receives training data sets 400 that include a set of one or more documents, some or all of which may be classified (also referred to as "labeled") with a document type. As discussed, the documents and their labels may be obtained from historical data (e.g., previously performed deals) and/or may be obtained from an expert that has labeled the documents. In embodiments, one or more of the documents may include metadata, including an author of the document, a date on which the document was created, a name of the document, and the like. In embodiments, the machine learning system 302 may perform feature extraction on the documents to extract one or more different features of each document. Examples of features that may extracted include various tokens (e.g., words, values, bi-grams, tri-grams, and n-grams of consecutive words or terms), TF-IDF of the tokens, extracted entities, and the like. The machine learning system 302 may identify and/or generate additional features (also referred to as "enrichment features") from the extracted features. In these embodiments, the machine learning system 302 may analyze the extracted features to identify one or more enrichment features based on the analysis of the extracted features. In embodiments, the machine learning system 302 may also rely on data from external data sources. In these embodiments, the machine learning system 302 may extract features from the external data sources. For example, the machine learning system 302 receive data relating to various users from one or more social networking sites. In this example, the machine learning system 302 may extract one or more features relating to a user who uploaded the documents 102, such as job title, experience level, and the like. The machine learning system 302 may train the models using the features of the documents provided as training data 400, as well as any classifications thereof. The machine learning system 302 outputs machine learned classification models 402 to the model datastore 328. In embodiments, the machine learning system 302 may also store the training data sets 400 on which the classification models 402 were trained in conjunction with the classification models 402. In these embodiments, the machine learning system 302 may retrain/update/reinforce a classification model 402 with corrections/verifications of classifications of documents that were made in connection with one or more future deals and that were based on the output of the classification model 402 in response to the documents that were involved in the one or more future deals.

Figure 5:
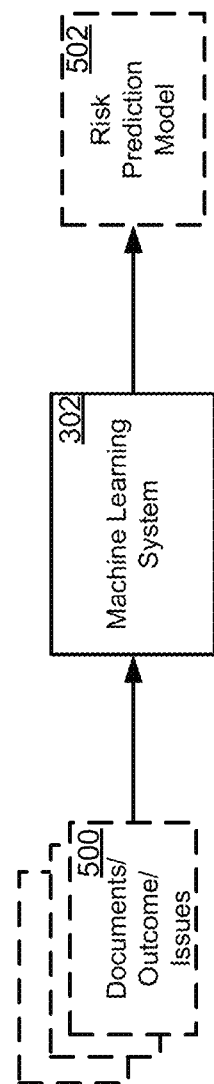
FIG. 5 is a schematic illustrating an example method and system for training a prediction model according to some embodiments of the present disclosure.

In embodiments, the machine learning system 302 trains machine-learned prediction models (or "prediction models") that are used to make predictions based on one or more training data sets of documents. FIG. 5 illustrates an example of the machine learning system 302 training a prediction model 502 based on training data sets 500 of documents. In embodiments, a prediction may indicate whether a deal is likely to be successful or unsuccessful based on a set of documents. In embodiments, a prediction may indicate any substantive issues that are likely to arise based on a set of documents (e.g., improper title to real or intellectual property, litigation risks, improper funding, inconsistent earning statements, and the like). In embodiments, a prediction may indicate whether there are likely specific types of documents missing that may cause an issue with the deal. Models that are used to make predictions relating to whether there are any likely issues pertaining to a deal (e.g., whether a deal is likely to be successful or unsuccessful or whether there are likely documents missing) may be referred to as risk prediction models.

In embodiments, a training data set 500 may include one or more documents associated with a deal (where a deal may refer to any document-intensive activity) and one or more outcomes associated with the deal based on the one or more documents (e.g., whether the deal was successful or unsuccessful, issues that arose during the deal based on the documents, and/or specific types of documents that were deemed missing during the deal). The prediction models 502 may be any suitable type of model, including a regression based model, a decision tree model, a neural network, a convolutional neural network, a deep neural network, a feed forward neural network, and the like. The prediction models 502 can be trained to identify a specific type of document or can be more general in that a single model 502 can classify many different types of documents.

In embodiments, the machine learning system 302 receives training data sets 500 that include a set of documents, some or all of which may be classified (also referred to as "labeled") with a document type and may include an outcome associated with the set of documents. As discussed, the documents and their outcomes may be obtained from historical data (e.g., previously performed deals) that was hosted by the deal room platform 100 and/or may be obtained from an expert that has labeled the outcomes. In embodiments, an outcome in a training data set 400 may indicate whether a deal was successful or unsuccessful based on the set of documents. In embodiments, an outcome in a training data set 400 may indicate any substantive issues that arose out of the deal based on the set of documents (e.g., improper title to real or intellectual property, litigation risks, improper funding, inconsistent earning statements, and the like). In embodiments, an outcome in a training data set 400 may identify one or more specific documents (e.g., Q4 2017 earnings report) or types of documents (e.g., articles of organization) that were deemed missing or insufficient in number. In embodiments, one or more of the documents may include metadata, including an author of the document, a date on which the document was created, a name of the document, and the like.

In embodiments, the machine learning system 302 may perform feature extraction on the set of documents in each training data set 500, as well as the individual documents within the set of documents, to extract one or more features corresponding to the training data set 500. Examples of features that may extracted include various tokens (e.g., words, values, bi-grams, tri-grams, and n-grams of consecutive words or terms), TF-IDF of the tokens, and the like. Additional features may include the classifications of the documents in the set, as well as any outcomes related to the documents in the training data set 500. The features may further include metadata or other relevant data that may be provided by a human, obtained from external data sources, or extracted using natural language processing, including identities of the parties involved, identities of the organizations involved (e.g., specific law firms, investment banks, and the like), the fields of operations of the parties, valuations of parties, amount of stock associated with a company, financial information, and the like. The machine learning system 302 may identify and/or generate additional features (also referred to as "enrichment features") from the extracted features. In these embodiments, the machine learning system 302 may analyze the extracted features to identify one or more enrichment features based on the analysis of the extracted features. The machine learning system 302 may train the models 502 using the features associated with each training data set 500, including any outcomes relating thereto. The machine learning system 302 outputs machine learned risk prediction models 502 to the model datastore 328. In embodiments, the machine learning system 302 may also store the training data upon which a risk prediction model was trained in the model datastore 328. In these embodiments, the machine learning system 302 may retrain/update/reinforce a risk prediction model 502 with predictions outcomes that were made in relation to a set of one or more documents that correspond to a future deal and one or more outcomes associated with the future deal.

Referring back to FIG. 3, the machine learning system 302 may train additional or alternative types of models. For example, the machine learning system 302 may be configured to train one or more content extraction and classification models that identify (or "extract") and classify specific clauses in contracts. In these embodiments, a content extraction and classification model may receive a document, a portion of a document, and/or features of the document/portion of the document and may output a classification of one or more provisions or sections of the documents that indicates a particular type of clause. For example, a content extraction and classification model trained to identify specific types of contract clauses (e.g., warranty clauses, arbitration clauses, joint IP clauses, limitations on liability, indemnification clauses, stock options, and the like). In this example, training data sets may include different contract clauses and classifications of the contract clauses. Similarly, the machine learning system 302 may be configured to train one or more content extraction and classification models that classify segments of non-contractual documents, such as litigation demand letters, cease and desist letters, bank records, earnings reports, shareholders reports, and the like. For example, a content extraction and classification model may be trained to identify specific types of content, such as cease and desist statements, demand statements, financial statements, earnings statements, account balances, and the like. In this example, training data sets may include different segments of a document or entire non-contractual documents (e.g., litigation demand letters, cease and desist letters, bank records, earnings reports, shareholders reports, and the like) and classifications of one or more segments contained therein. The machine learning system 302 may train the content extraction and classification models using historical training data or expert training data, in the manner described above.

The machine learning system 302 may train additional or alternative prediction and classification models that are used by other components of the data room platform. For example, the machine learning system 302 may train image classification models that classify the contents of documents containing images. In another example, the machine learning system 302 may train table extraction and classification models that identify tables in a document and classify the tables. In these embodiments, a table extraction and classification model may be further configured to extract the substantive content from an extracted table. In another example, the machine learning system 302 may train descriptive models that analyze a set of documents and identify one or more characteristics of a deal based on the documents.

In embodiments, the machine learning system 302 receives feedback data (e.g., outcomes) relating to one or more classifications or predictions resulting from one or more models. In response to such feedback data 302, the machine learning system 302 updates the respective models (e.g., retrains the respective models) using the feedback data. In this way, the accuracy of the model may be improved as the model is being deployed.

In embodiments, the artificial intelligence system 304 performs cognitive tasks for different components of the data room platform 100, including classifying input data, making predictions relating to input data, and/or making decisions based on a classification or prediction that is based on the input data. The artificial intelligence system 304 may utilize any suitable techniques to perform artificial intelligence processes. For example, the artificial intelligence system 304 may execute rules-based logic and/or may leverage one or more machine-learned models to perform a cognitive task.

In embodiments, the artificial intelligence system 304 classifies uploaded documents 102. In these embodiments, the artificial intelligence system 304 may leverage one or more document classification models to classify an uploaded document. In operation, the artificial intelligence system 304 may load the one or more document classification models from the model datastore. The artificial intelligence system 304 may extract the features of the uploaded document 102. For example, the artificial intelligence system 304 may extract tokens (e.g., words, values, bi-grams, tri-grams, n-grams of consecutive words or terms), TF-IDF of the tokens, tokens appearing in headers, tokens appearing with emphasis, extracted entities, and the like from the uploaded document 102. The artificial intelligence system 304 may further extract features such as a time stamp, an author of the document, a title of the document, and the like. The artificial intelligence system 304 may also determine one or more enrichment features based on the extracted features. The artificial intelligence system 304 may then generate a feature vector based on the extracted/determined features, and may feed the feature vector into the one or more document classification models. In response, the one or more classification models output one or more candidate classifications. Each candidate classification may include a score that indicates a degree of confidence in the classification. The artificial intelligence system 304 may then select a classification from the one or more candidate classifications based on the respective scores. For example, in embodiments, the artificial intelligence system 304 may select the candidate classification having the highest score. In embodiments, the artificial intelligence system 304 may utilize more than one document classification model. In these embodiments, the artificial intelligence system 304 may select the classification having the highest average confidence score across the multiple models. The artificial intelligence system 304 may output the selected classification to the requesting system.

In embodiments, the artificial intelligence system 304 identifies and classifies clauses in contracts and/or segments in non-contractual documents. In these embodiments, the artificial intelligence system 304 may leverage one or more content extraction and classification models to identify different types of clauses or segments appearing in an uploaded document 102 or a set of uploaded documents. In operation, the artificial intelligence system 304 may load the one or more content extraction and classification models from the model datastore. In embodiments, the artificial intelligence system 304 receives a document and parses the document into logical segments. For example, the artificial intelligence system 304 may parse the document by headers, sub-headers, sentences, paragraphs, lines, or the like. The artificial intelligence system 304 may extract one or more features of the segments. For example, the artificial intelligence system 304 may extract tokens (e.g., words, values, bi-grams, tri-grams, and n-grams of consecutive words or terms), TF-IDF of the tokens, extracted entities, and other suitable features of each segment of the uploaded document 102. The artificial intelligence system 304 may also determine one or more enrichment features based on the extracted features. The artificial intelligence system 304 may then generate a feature vector based on the extracted/determined features. The artificial intelligence system 304 may feed the feature vector to the one or more content extraction and classification models, each of which in turn outputs one or more respective candidate content types. The content extraction and classification models may further output a respective candidate score for each respective candidate content type indicating a degree of confidence in the classification. The artificial intelligence system 304 may then select a content type from the one or more candidate content types based on the respective confidence scores. For example, in embodiments, the artificial intelligence system 304 may select the candidate content type having the highest score. In embodiments, the artificial intelligence system 304 may utilize more than one content extraction and classification model. In these embodiments, the artificial intelligence system 304 may select the candidate content type having the highest average confidence score across the multiple models. The artificial intelligence system 304 may output the selected content type to the requesting system.

In embodiments, the artificial intelligence system 304 makes predictions regarding a set of one or more uploaded documents 102 in an organizational structure. For example, the artificial intelligence system 304 may predict whether a transaction is likely to be successful or unsuccessful, one or more particular issues that may arise during the transaction to which the documents relate, gaps in the set of documents, security issues, and the like. In these embodiments, the artificial intelligence system 304 may leverage one or more risk prediction models to make a prediction relating to a set of documents stored in an organizational structure. In operation, the artificial intelligence system 304 may load the one or more risk prediction models from the model datastore. The artificial intelligence system 304 may extract the features of the set of documents to be analyzed. For example, the artificial intelligence system 304 may extract the number of documents in the set of documents, the titles of the documents, the classifications of the documents, the dates on which the documents were created, tokens (e.g., words, values, bi-grams, tri-grams, and n-grams of consecutive words or terms), TF-IDF of each of the tokens, tokens appearing in headers, tokens appearing with emphasis, parties involved in the deal, organizations involved in the deal, and the like from the set of documents. In embodiments, the artificial intelligence system 304 may generate a feature vector based on the extracted features and may feed the feature vector into the one or more risk prediction models. In response, the one or more risk prediction models output one or more candidate risk predictions. Each candidate prediction may include a confidence score that indicates a degree of confidence in the respective risk prediction. The artificial intelligence system 304 may then select a risk prediction from the one or more candidate predictions based on the respective scores. For example, in embodiments, the artificial intelligence system 304 may select the candidate risk prediction(s) having the highest respective score(s). In embodiments, the artificial intelligence system 304 may utilize more than one risk prediction model. In these embodiments, the artificial intelligence system 304 may select the risk prediction(s) having the highest average confidence score(s) across the multiple models. The artificial intelligence system 304 may output the selected risk prediction to the requesting system.

The artificial intelligence system 304 may perform additional or alternative tasks. In embodiments, the tasks may include determining one or more folder structures in which a classified document should be stored. In embodiments, the tasks may include identifying parties (e.g., potential buyers or sellers) that may be interested in a particular transaction.

The clustering system 308 receives one or more data items (e.g., documents) and clusters the data items based on the features thereof. The clustering system 308 may utilize any suitable clustering techniques to cluster the data items. For example, the clustering system 308 may implement k-nearest neighbors and/or k-means clustering. In operation the clustering system 308 may extract n features of each data item using one or more feature extraction techniques. In embodiments, the clustering system 308 may then calculate a respective "distance" between pairs of respective data items in an n-dimensional space based on the n features of each respective data item using a suitable distance formula. The clustering system 308 may then cluster the data items based on the respective distances. For example, the clustering system 308 may identify the k nearest neighbors (i.e., the data items having the smallest distance between a particular data item) for each of a group of selected data items, where the group of selected data items are the respective centers of the clusters. It is noted that in some embodiments, the clustering system 308 may iterate multiple times to identify the best selected data items, so as to minimize the average distance between the members of a cluster and the selected data item (the center of the cluster). In embodiments, the clustering system 308 determines k clusters (k-means clustering) and assigns each respective data item to one of the k clusters based on a distance between the data item and the cluster (e.g., the center of the cluster). It is noted that in implementations, the clustering system 308 may iterate multiple times to identify an appropriate center for each of the k clusters. The clustering system 308 may be leveraged by other systems of the cognitive processes system 204. For example, the clustering system 308 may cluster unlabeled documents with labeled documents for the purposes of classifying unlabeled training data and/or an uploaded document.

The natural language processing system 310 receives text and interprets the meaning of the text. In embodiments, the natural language processing system 310 may be used to interpret text from documents (e.g., contracts, emails, purchase orders, demand letters, and the like), code documentation, audio transcripts (e.g., audio from videos, recorded conversations, and the like), and any other relevant text source. The natural language processing system 310 may process the text using any suitable natural language processing algorithms and techniques. In embodiments, the natural language processing system 310 receives the text, extracts features from the text (e.g., tokens of uni-grams, bi-grams . . . n-grams, extracted entities, and the like), and determines a likely meaning of the text based on the extracted features. In embodiments, the natural language processing system 310 further utilizes data received from one or more external data resources to assist in the natural language processing process. The natural language processing system 310 may output the determined meaning (which may be represented in a domain-specific data structure) to a requesting system. In embodiments, the natural language processing system 310 may be called by the machine-learning system 302, the artificial intelligence system 304, the clustering system 308, and/or the natural language generation system 310, such that the requesting system provides text that needs to be processed to perform a task by the requesting system. The natural language processing system 310 may be called by additional or alternative systems of the data room platform.

In embodiments, the natural language generation system 312 may implement a range of approaches, or hybrids thereof, to generate natural language. In some cases, the natural language generation system 312 may utilize a knowledge graph that defines a corpus of entities and relationships between those entities that is organized according to a predefined ontology to generate text. In embodiments, the entities are represented by nodes storing, inter alia, an entity type and value, and the relationships are represented by edges, where different types of relationships are labeled as such. The knowledge graph may be human generated and/or machine generated. In some embodiments, the knowledge graph is partially generated using data that is specific to the data room platform, or even the parties of a particular document-intensive activity. In this way, the generated text may more closely relate to the data room platform users, as the natural language generation system 312 may be better able to leverage very high confidence data from the knowledge graph. In embodiments, the data in the knowledge graph may not be of sufficient structure or confidence. In these embodiments, the natural language generation system 312 may use a generative model to generate tokens (e.g., words and phrases) from the content in the knowledge graph associated with an organization or individual, whereby the model can be trained (e.g., using a training set of input-output pairs) to generate content, such as headlines, phrases, sentences, or longer content that can be inserted into the output text. The natural language generation system 312 may utilize any suitable type of generative model, including one or more neural networks, deep neural networks, feed-forward neural networks, recurrent neural networks, and the like may be used. The natural language generation system 312 may implement any suitable natural language generation techniques, such as end-to-end machine learning, or a series of stages including content determination, document structuring, aggregation, lexical choice, referring expression generation, and realization.

In embodiments, the natural language generation system 312 may utilize a template from a plurality of different templates as a starting point for generating text. The template may be used to provide structure and organization to a document or segment of a document, "boilerplate" that may be used in a document or a segment of a document (i.e., non-generative text to be included in a document or segment of a document), the style of writing for the document or segment of a document (e.g., formal, informal, legalese, and the like.), a language of the text, and the like. The natural language generation system 312 may generate text using the techniques discussed above and/or other suitable techniques and may populate the template with the generated text.

Referring back to FIG. 2, in embodiments, the document intake system 308 manages permissions relating to the uploading of documents with respect to each organizational structure. In embodiments, when a user requests to perform an operation such as uploading a document, altering a document, accessing a document, and/or deleting a document, the data room management system 302 may determine a user that is attempting to perform the operation. The data room management system 302 may then determine the user's permissions with respect to the organizational structure/deal that the requested operation updates metadata is to be performed. In embodiments, the permissions corresponding to a particular deal/organizational structure may be stored in a deal record corresponding to the deal. In other embodiments, the permissions corresponding to a particular deal/organizational structure may be stored in a cryptographic ledger. Upon determining the user has sufficient permission to perform the operation, the data room management system 302 may instruct the document intake system 308 may perform the requested operation. For example, the data room management system 302 may instruct the document intake system 308 to receive and classify an uploaded document and to associate the classified document with one or more folders 106 of the organizational structure 104 based on the classification.

In embodiments, the document intake system 308 receives documents from one or document sources 180 (FIG. 1) and associates the documents with one or more folders 106 of an organizational structure 104 based on a respective analysis of each received document. As noted, the term associating a document with one or more folders 106 may include one or more of creating a logical link or relationship between each document and the one or more respective folders 106 and/or storing each document with one or more of the respective folders 106 in a file system. Examples of document sources 150 may include client user devices 150 (FIG. 1), data servers associated with a party to the document-intensive activity (e.g., a data server of a potential buyer or seller), data servers of third parties (e.g., a bank data server), publicly available services, governmental databases, websites, and the like. The document intake system 308 may receive the documents individually or in batches.

Figure 6:
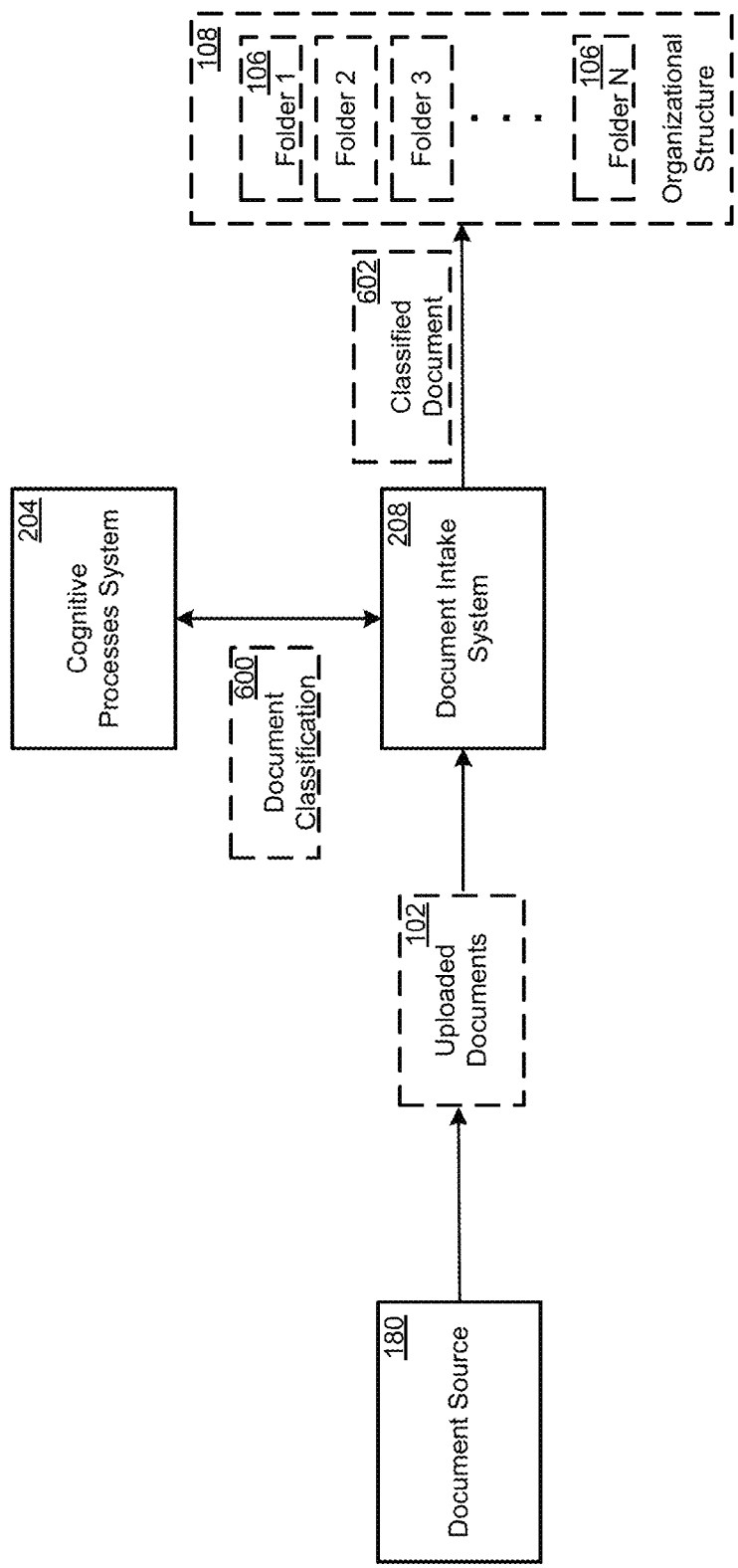
FIG. 6 is a schematic illustrating an example method and system for classifying and storing an uploaded document according to some embodiments of the present disclosure.

FIG. 6 illustrates an example method and system for classifying and storing uploaded documents 102. In this example, the document intake system 308 receives a document from a document source 180. For purposes of explanation, the document intake system 308 is shown as ingesting and processing documents individually. It is understood that the document intake system 308 may process a batch of documents in a parallel manner. The document intake system 308 may provide the document to the cognitive processes system 204, which outputs a document classification 600. The cognitive processes system 304 may determine the document classification 600 in any suitable manner. In embodiments, the cognitive processes system 204 (e.g., the artificial intelligence system 304) may leverage one or more document classification models to classify the document 102. In embodiments, the cognitive processes system 204 may cluster the document 102 with other classified documents involved in the document-intensive activity and/or a corpus of classified documents pertaining to a collection of deals. The cognitive processes system 204 may classify the document in additional or alternative manners. The document intake system 308 receives the document classification 600 and associated the document classification 600 with the uploaded document 102 to obtain a classified document 602. The document intake system 208 may determine one or more folders 106 of the organizational structure 104 corresponding to the deal with which the classified document 602 may be associated based on the classification 600. The document intake system 208 may apply a rules-based approach or may use the cognitive processes system 204 to determine the folder 106 with which the classified document 604 is to be associated. For example, the document intake system 308 may apply one or more business rules that define the appropriate folder 106 or folders 106 with which classified documents 602 having a particular classification should be associated. In another example, the artificial intelligence system 304 may be trained to determine an appropriate folder 106 or folders 106 based on the document classification. Upon determining the appropriate folder 106 or folders 106, the document intake system 308 may associate the classified document 602 with the appropriate folder 106 or folders 106 in the organizational structure 104. As noted, the associating a document with one or more folders 106 may include one or more of creating a logical link or relationship between each document and the one or more respective folders 106 and/or storing each document in one or more of the respective folders 106 in a file system.

In embodiments, the document intake system 308 (and/or the data room management system 302) updates metadata relating to each document, each time the document is added, edited, accessed, and deleted. In embodiments, the document intake system 308 may update a document record of the document to indicate the operation that was performed, the user who performed the operation, and a time that the operation was performed. In other embodiments, the document intake system 308 may determine any information relating to the operation (e.g., the operation that was performed, the user who performed the operation, and a time that the operation was performed), and may call the ledger management system 214 to update a cryptographic ledger based on the information relating to the operation, as will be discussed in greater detail.

In embodiments, the risk identification system 210 identifies risks associated with a deal. In embodiments, a risk may indicate whether the deal is likely to be unsuccessful or unsuccessful. In embodiments, a deal may be considered likely to be successful if the risk identification system 210 determines that all of one or more objectives are likely to be met and likely to be unsuccessful if one or more of the objectives are unlikely to be met. In these embodiments, the objectives may be general objectives, buyer objectives (e.g., seller has shown proper title to all assets, seller has provided all required documents), and/or seller objectives (e.g., buyer has shown adequate financing for the transaction, buyer has provided all required documents). The objectives may be default settings, may be learned via machine learning, and/or may be provided by a user. In embodiments, a risk may indicate a potential issue that may arise with respect to the contents of the deal itself (e.g., insufficient funds, litigation risks, unreasonable executive buyout clauses, and the like), and/or potential issues resulting from insufficient documents (e.g., missing financial documents). In some of these embodiments, the issues that may arise may be objectives that are unlikely to be met. In embodiments, the risk identification system 210 obtains a set of documents relating to a deal. For example, the risk identification system 210 may obtain all of the documents in an organizational structure relating to a particular deal, or all of the documents arranged in a particular folder of the organizational structure. In embodiments, the risk identification system 210 may also obtain external data from one or more external data sources. External data sources may include social networking platforms (e.g., Facebook®, LinkedIn®, and the like), company websites, governmental websites (e.g., the United States Patent and Trademark Office, the Securities and Exchanges Commission, the Department of Justice, court websites, and the like), blogs, ratings platforms (e.g., Glassdoor® and the like). The risk identification system 210 may then provide the documents (or data representing the documents) and any external data to the cognitive processes system 204, where the cognitive process system 204 extracts features of the documents and/or the external data and feeds the features into a risk prediction model. The risk prediction model may output any risks that are associated with a deal. For example, the risk prediction model may predict whether a deal is likely to be successful or unsuccessful, whether any issues are predicted to arise with the deal itself, or any types of documents that are likely missing from the document set. In embodiment, one or more risk prediction models may output a series of prediction scores, where each respective prediction score may relate to a respective objective. In some of these embodiments, each outputted prediction score may be indicative of a likelihood (e.g., a probability) that a respective objective is likely to be met or to occur. The risk identification system 210 may receive the prediction scores and may determine whether a deal is likely or unlikely to be successful. In some of these embodiments, the risk identification system 210 may determine whether any of the prediction scores is less than a corresponding threshold. If so, the risk identification system 210 may determine that a deal is likely to be successful. In embodiments, the risk identification system 210 may determine that a deal is likely to be successful or unsuccessful by determining an overall score based on the predictions scores. In these embodiments, the risk identification system 210 may assign weights to each respective prediction score and may determine the overall score based on the weighted values of each respective prediction score. The risk identification system 210 may then compare the overall score to a threshold to determine whether the deal is likely to be successful or unsuccessful. Furthermore, in some embodiments, upon determining that a deal is likely to be unsuccessful, the risk identification system 210 may identify issues that are likely to arise based on the prediction scores relating to respective objectives. For example, the risk identification system 210 may determine a particular issue is likely to arise if a prediction score of an objective corresponding to the particular issue is below a respective threshold or if a weighted prediction score corresponding to the particular issue is below a respective threshold. The risk identification system 210 may identify additional or alternative risks that may be associated with a deal, including risks associated with software code or regulatory bodies.

In embodiments, the risk identification system 210 may identify any risks associated with a deal and may covey the identified risks to a user. In embodiments, the risk identification system 210 may trigger a notification that is sent to user devices of one or more users associated with the deal. In embodiments, the risk identification system 210 displays the risk-related determinations to a user via a graphical user interface (e.g., a dashboard). In these embodiments, the risk identification system 210 may display a determination as to whether the deal is likely to be successful or unsuccessful and/or any issues that may have been flagged by the risk identification system 210. In some of these embodiments, the risk identification system 210 (or another system of the deal room platform 100) may alter the appearance of each potential risk in the graphical user interface to covey a degree of confidence in the prediction. For example, a risk prediction having a high confidence score (e.g., ≥0.90) may be displayed in full opacity, while risk predictions having relatively low confidence scores (e.g., <50%) may be displayed in varying degrees of transparency. In embodiments, the risk identification system 210 may convey potential risks to one or more users in a machine-generated risk assessment memo. In these embodiments, the document generation system 212 may generate the machine-generated document, which indicates the identified risks.

In embodiments, the document generation system 212 generates machine-generated documents 108 (FIG. 1). The machine-generated documents 108 may relate to any aspect of a deal. In embodiments, the document generation system 212 may generate advisory memos based on the contents in the one or more specific folders 104. An advisory memo may be a document that indicates one or more items of interest in a group of documents. For example, with respect to an advisory memo relating to executive stock options, the advisory memo may indicate each person in an organization with a stock option, a number of shares allocated by each stock option, and a vesting schedule for each stock option. In embodiments the document generation system 212 may generate risk assessment memos. A risk assessment memo may indicate any risks associated with a deal that are identified by the risk identification system 212. For example, a risk assessment memo may indicate litigation risks, prohibitive stock buyouts, insufficient funds, missing documents, and the like.

Figure 7:
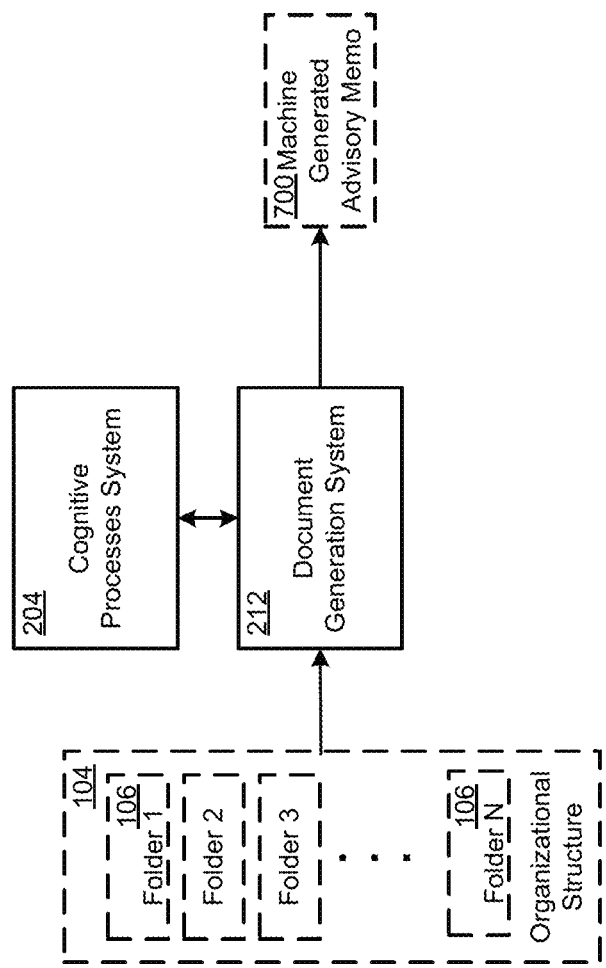
FIG. 7 is a schematic illustrating an example method and system for generating a machine-generated advisory memo based on a set of documents stored by the data room platform according to some embodiments of the present disclosure.

FIG. 7 illustrates an example of the document generation system 212 generating a machine-generated advisory memo 700. As discussed, the advisory memo 700 may indicate one or more items of interest relating to a group of documents. In embodiments, the document generation system 212 may receive a request to generate a machine-generated advisory memo 700. The request may be initiated by a human or may be issued automatically by, for example, the deal room management system 202 after an event, such as uploading a group of documents. In response to the request, the document generation system 212 selects a group of documents to be analyzed. For example, the document generation system 212 may select all of the documents in a particular folder 106 of an organizational structure 104. The document generation system 212 may pass the documents (or identifiers thereof) to the cognitive processes system 204. The cognitive processes system 204 may analyze the group of documents to identify certain types of information contained in each of the documents. In some embodiments, the natural language processing system 310 (and/or the artificial intelligence system 304) may extract the features of each document and the artificial intelligence system 304 may input the extracted features into one or more content extraction and classification models that classify specific clauses in contracts or segments of non-contractual documents. Each respective model of the one or more content extraction and classification models may output any clauses or content segments that were identified by the model. The output may be indicative of the document from which the clause or content segment was identified, the type of clause or content that was identified, the language used in the clause or content segment, and/or a location in the document where the language was found. The artificial intelligence system 304 may then pass the results of the analysis to the natural language generation system 312 requesting an advisory memo. In embodiments, the document generation system 212 may also provide or indicate a template with which the cognitive processes system 204 is to generate the advisory memo. In embodiments, the natural language generation system 312 receives the identified text (e.g., the contract clauses or content segments) and the corresponding data (e.g., the text from which each clause or content segment was identified, a clause or content segment type, and a location in the document where the clause or content segment was identified), and generates the machine-generated advisory memo 700 based on the received information and the advisory memo template. The cognitive processes system 204 may output the machine-generated advisory memo 700 to the document generation system 212. In embodiments, the document generation system 212 may associate the machine-generated advisory memo 700 with one or more folders 106 in the organizational structure 104 (e.g., with a folder 106 dedicated to machine-generated documents or with a folder 106 that stored the documents that were used to generate the machine-generated advisory memo 700). Additionally or alternatively, the document generation system 212 may transmit the advisory memo 700 to one or more users associated with the deal (e.g., a requester of the deal, an attorney working on behalf of the buyer, an attorney working on behalf of the seller, and the like).

Figure 8:
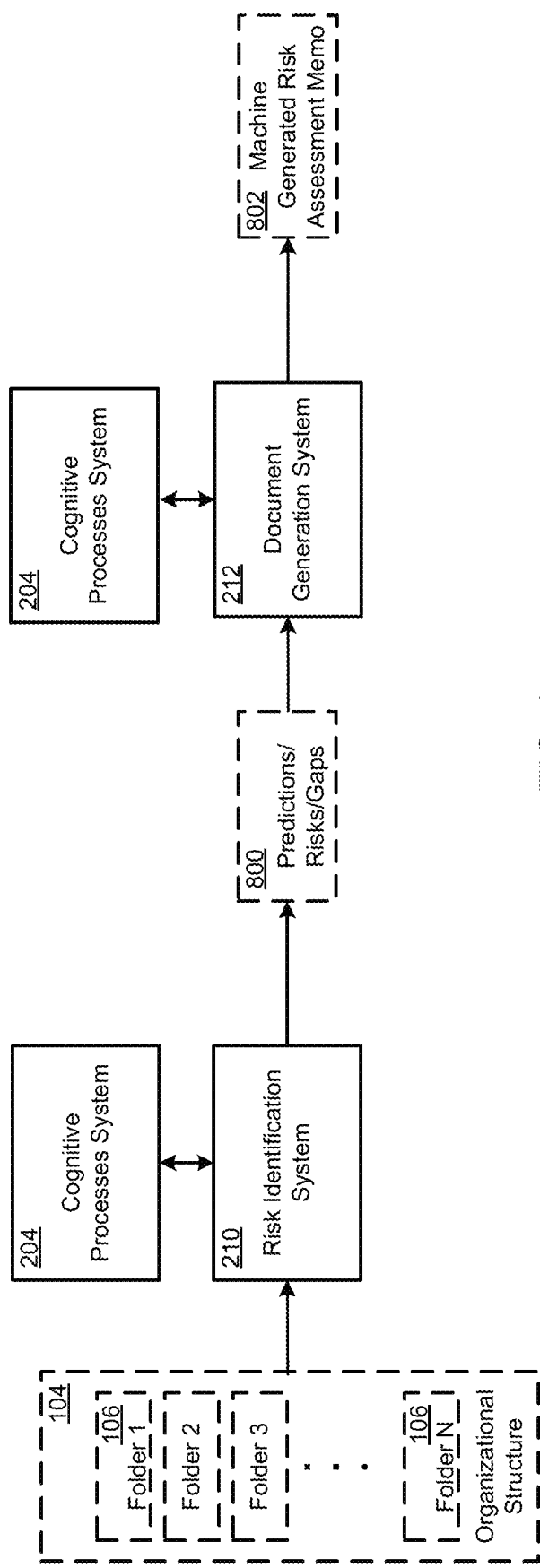
FIG. 8 is a schematic illustrating an example method and system for determining one or more issues relating to a set of documents and generating a machine-generated risk assessment memo based on the determined issues according to some embodiments of the present disclosure.

FIG. 8 illustrates an example of the document generation system 212 generating a machine-generated risk assessment memo 802. As discussed, the risk assessment memo may indicate one or more risks associated with a group of documents that pertain to a deal. The risks may pertain to the deal itself (and/or whether the deal is likely to be successful or unsuccessful) or may be indicative of gaps in the documents (e.g., documents that are missing). In embodiments, the risk identification system 210 may receive a request to generate a machine-generated risk assessment memo 802. The request may be initiated by a human or may be issued automatically by the deal room management system 202 after an event, such as uploading a group of documents. In response to the request, the risk identification system 210 selects a group of documents to be analyzed for potential risks. For example, the risk identification system 210 may select all of the documents in an organizational structure 104 or one or more documents in a folder in the organizational structure. The risk identification system 210 may pass the documents (or identifiers thereof) to the cognitive processes system 204. The cognitive processes system 204 may analyze the group of documents to identify potential risks associated with the set of documents. In some embodiments, the natural language generation system 310 (and/or the artificial intelligence system 304) may extract the features of each document and artificial intelligence system 304 may pass the extracted features into one or more risk prediction models that identify potential risks. Each respective model of the one or more prediction models may output risk predictions 800 pertaining to one or more types of risks. For example, a first prediction model may output risk predictions 800 indicating potential risks pertaining to a deal itself, such as whether the deal is likely to be successful or unsuccessful, potential for litigation, inconsistent financial statements, prohibitive stock buy outs, and the like. A second prediction model may output risk predictions 800 that indicate types of documents that are missing (e.g., earnings reports, patent assignments) or specific documents that are missing (e.g., Q3 2016 shareholders report). The risk predictions 800 may indicate the potential risks that were identified, the type of potential risk identified, the documents from which any potential risks were identified, the language giving rise to the risk, a location in the document(s) where the language was found, types of documents that may be missing, and any other suitable information. The artificial intelligence system 304 may then pass the risk prediction 800 stemming from the analysis back to the risk identification system 210. The risk identification system 210 may pass the risk prediction 800 to the document generation system 212. The document generation system 212 may pass the risk prediction 800 to the cognitive processes system 204, which generates a risk assessment memo 802 based thereon. In embodiments, the document generation system 212 may also provide or indicate a risk assessment memo template with which the cognitive processes system 204 is to generate the machine-generated risk assessment memo 802. In embodiments, the document generation system 212 may identify the risk assessment memo template based on the type of risk that was identified (e.g., missing documents or substantive risks associated with the deal). In embodiments, the natural language generation system 312 receives the risk prediction 800 and the corresponding data (e.g., the document(s) from which the risk was identified, the language giving rise to the risks, and location(s) in the document(s) where the risk was identified), and generates the machine-generated risk assessment memo 802 based on the received risk prediction 800 and the risk advisory memo template. The cognitive processes system 204 may output the machine-machine-generated risk assessment memo 802 to the document generation system 212. In embodiments, the document generation system 212 may associate the machine-generated risk assessment memo 802 with one or more folders 106 in the organizational structure (e.g., in a folder 106 dedicated to identified risks). Additionally or alternatively, the document generation system 212 may transmit the machine-generated risk assessment memo 802 to one or more users associated with the deal (e.g., a requester of the deal, an attorney working on behalf of the buyer, an attorney working on behalf of the seller, and the like).

Referring back to FIG. 2, in embodiments, the deal room platform 100 may include a ledger management system 214. The ledger management system 214 manages one or more cryptographic ledgers (also referred to as a "ledgers"). It is noted that any use of the term "ledger" is made in reference to a cryptographic ledger. In embodiments, the ledger management system 214 may instantiate a cryptographic ledger for each deal room, such that each cryptographic ledger is specific to a respective deal and deal room. In other embodiments, the ledger management system 214 may maintain a cryptographic ledger that records actions for some or all of the deals being hosted by the deal room platform 100.

In embodiments, the cryptographic ledger is any suitable type of blockchain. Any other suitable types of cryptographic ledgers may be used, however, without departing from the scope of the disclosure. As discussed, the cryptographic ledger may be distributed or non-distributed (i.e., stored entirely at the deal room platform 100). For purposes of explanation, discussion is made with respect to a distributed cryptographic ledger (also referred to as a "distributed ledger"). The techniques described herein may be applied, however, to non-distributed ledgers as well. In embodiments, the cryptographic ledgers are federated cryptographic ledgers, as the cryptographic ledgers may be stored on pre-selected or preapproved nodes that are associated with the parties to a deal. The techniques described herein may be applied, however, to public cryptographic ledgers as well.

In embodiments, the ledger management system 214 leverages a cryptographic ledger to create an immutable log of the actions performed with respect to a deal being hosted in a deal room. Additionally or alternatively, the ledger management system 214 may utilize a cryptographic ledger to manage a set of permission keys that provide access to data and/or services associated with the deal room. Additionally or alternatively, the ledger management system 214 may manage the cryptographic ledger to facilitate cooperation between two or more parties participating in a deal, such that interactions between the parties may be logged on the cryptographic ledger and may serve as a basis for progressing the deal along a deal workflow.

Figure 9:
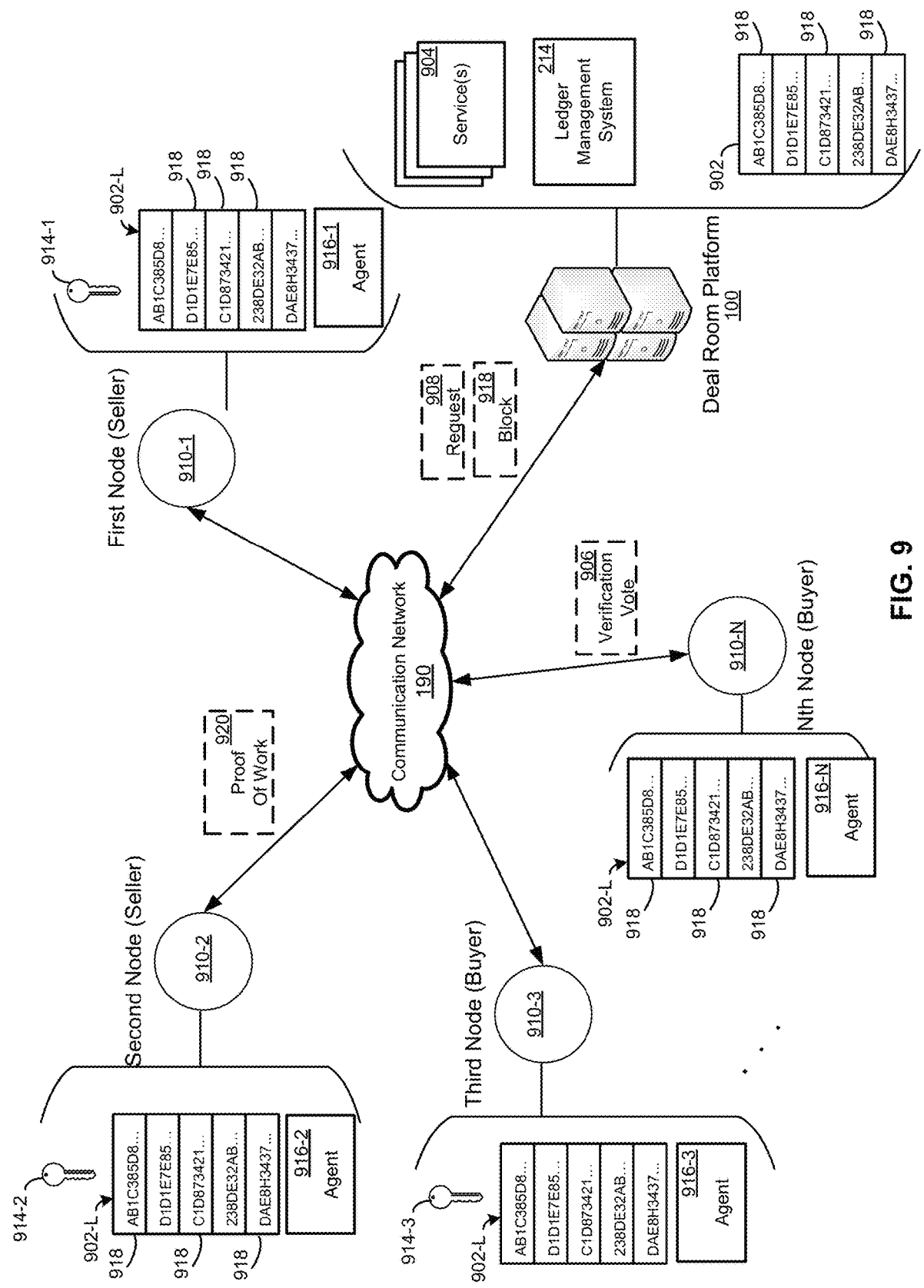
FIG. 9 is a schematic illustrating an example federated network for leveraging a cryptographic ledger to support one or more aspects of a deal hosted by the deal platform according to some embodiments of the present disclosure.

FIG. 9 illustrates an example environment of a federated network 900 for maintaining a distributed cryptographic ledger 902 in connection with a deal being hosted by the deal room platform 100. In embodiments, the federated network 900 includes the deal room platform 100 and a plurality of other node computing devices 910 (or "nodes") that communicate with each other via a communication network 190. For example, the federated network 900 may include a first node 910-1, a second node 910-2, a third node 910-3 . . . and an Nth node 910-N that communicate with the deal room platform 100 and with other nodes 910 in the communication network 190. In embodiments, the deal platform 100 executes a ledger management system 214 and may store and manage a local copy of a cryptographic ledger 902 that is used in connection with a deal that is hosted by the deal room platform 100. It is noted that in general, the deal room platform 100 (or the ledger management system 214 executed thereon) may also be thought or and referred to as a node of the network 900. In some of these embodiments, the deal room platform 100 may provide one or more cloud-based services 904 that are provided by deal room platform 100. Examples of services 902 may include fulltext search of documents, virus scanning of documents, automated document generation, automated document classification, and the like. In some embodiments, participants may be granted access to one or more of the available services 904. Furthermore, in embodiments, the ledger management system 214 may also generate and assign private key and public key pairs to each participant in a deal room and/or each node 910 in the network 900, such that the private key and public key pairs are used to encrypt data that is being transmitted between nodes 910 in the network 900, as is known in the art.

In embodiments, each other node 910 may be a computing device that is associated with a party to the deal (e.g., a company, law firm, or investment bank participating in the deal) and/or one or more participants in the deal (e.g., individual users that have been granted access to the deal). It is noted, however, that in some embodiments a node 910 does not necessarily need to be associated with a participant or even a party to the deal. Furthermore, in embodiments, each node 910 in the network 900 may store a respective local copy 902-L of the cryptographic ledger 902, where each local copy 902-L may be the entire cryptographic ledger 902 that is associated with the deal or a portion thereof. In some embodiments, each node 902 may execute a respective agent 916. An agent 916 may be configured to: manage the local copy 902-L of the cryptographic ledger 902; help verify blocks that were previously stored on the ledger; to help verify requests from other nodes 910 to store new blocks on the ledger 902; request permission to perform operations relating to the deal or deal room on behalf of a user associated with the node 910 on which the agent resides; and/or to facilitate collaboration between parties in a deal by assisting in the execution of a workflow associated with the deal using, for example, smart contracts. The agent 916 may be configured to perform additional or alternative tasks as well.

In embodiments, the network 900 is referred to as being "federated", as the ledger management system 214 of the deal room platform 100 may act as an arbiter to simplify the consensus mechanism and some or all of the nodes 910 may be preselected or preapproved to act as nodes 910 with respect to the transaction. In this way, the ledger management system 214 can ease the computational burdens on the other nodes 910 in the network 900. In these embodiments, however, the cryptographic ledger 900 is referred to as being "distributed" as the participating nodes 910 may each store a respective local copy 902-L of the cryptographic ledger 902, where each local copy 902-L may include the entire cryptographic ledger 902 or a portion thereof.

In the illustrated example, the deal room platform 100 stores a local copy 902 of the cryptographic ledger 902, and each node 910 stores a distributed copy 902-L of the cryptographic ledger 902. A distributed copy (e.g., copy 902-1) of the cryptographic ledger 902 may contain the entire ledger 902 or only a portion of the ledger 902. In general, each copy of the ledger 902 stores a set of blocks 918. In embodiments, each respective block may store information relating to a respective state change events as a hash values and may further store a block identifier of a "parent" block that was added to the ledger 902 prior to the respective block. In embodiments, the ledger management system 214 may select the block that was most recently added to the ledger to act as the parent block, whereby the ledger management system 214 includes the block identifier of the most recently added block to the state change event record.

A state change event may refer to any change of state relating to the deal. Non-exhaustive examples of state change events may include creating a new deal room, adding a new participant to the deal room, granting the new participant permission to perform a specific operation, uploading a document, requesting to perform a specific operation (e.g., upload, view, edit, delete, download, print, and the like) on a document, denying a request, allowing a request, issuing a service-specific permission key to a user, allowing a user to access a specific service 904 of the platform 100, and the like. For each state change event that occurs with respect to a deal, the ledger management system 214 may create a state change event record that indicates the state change event (e.g., the operation that was performed). A state change event record may further include information relating to the event, such as: one or more user identifiers of one or more respective users associated with the state change event (e.g., the user that is requesting, performing, allowing, and/or denying an operation); a timestamp corresponding to the state change event; a device identifier of the device that requested or performed an operation; an IP address corresponding to the device that requested or performed the operation; and/or any other relevant data. In embodiments, the ledger management system 214 also includes a block identifier of a previous block that was previously stored on the ledger 902 in the state change event record. In this way, the previous block may be a "parent" to a new block that will be generated based on the state change event record, as the state change event record references the previously stored block, but the previously stored block will not reference the new block. As will be discussed in greater detail, in embodiments, the block identifier may be the hash value of a previously generated block. In embodiments, the le state change event record that corresponds to a previous state change event.

In embodiments, the ledger management system 214 may generate a state change event record for each event occurring with respect to a deal room. The ledger management system 214 may then generate a new block 918 corresponding to the state change event record by generating a cryptographic hash (or "hash value") of the state change event record by inputting the state change event record into a hashing function to obtain the cryptographic hash. The resultant hash value is a unique value (or substantially unique value with a very low likelihood of collisions) that represents the contents of the state change event record. In this way, the resultant hash value is a unique identifier that identifies the new block and that also encodes the contents thereof, including a block identifier of the parent block. Thus, when the new block is "solved" (solving a block in this context may refer to the process of determining the original contents of the state change event record encoded in the hash value), the solution of the new block indicates the contents of the state change event record, including the block identifier of the parent block. As such, the hash value of the preceding state change event record may be used to verify the authenticity of the current state change event record by way of verification.

It is noted that while the above description describes blocks that store only one state change event record, in embodiments, the ledger management system 214 may encode two or more state change event records in a single block. In these embodiments, the ledger management system 214 may include the two or more state change event records in the body of a new block data structure and may include the block identifier of the previous block in a block header of the new block data structure. The ledger management system 214 may then input the new block data structure into the hashing function, which outputs the new block 918. In these embodiments, the new block 918 may be a cryptographic hash that represents the two or more state change event records and the block identifier of the previous block (i.e., the parent block to the new block). In this way, when the new block is solved, the solution to the block is the two or more state change event records and the block identifier of the parent block, where the block identifier of the parent block can be used to validate the authenticity and accuracy of the new block.

In embodiments, the ledger management system 214 (or another node 910) may request verification of a block 918. Verification of a block 918 may include broadcasting a request 908 to verify a block 918 (referred to as "the block 918 to be verified") to the other nodes 910 in the network 900 (which may include the ledger management system 214 if the ledger management system 214 is not issuing the request 908). In embodiments, the request 908 may be broadcasted with the block 918 to be verified. Verification may further include one of the other nodes 910 that received the request 908 (or potentially the ledger management system 214) solving the block 918 to be verified. A node 910 may determine it has solved the block 918, when the solution to the block contains a valid block identifier—that is, a block identifier that references one of the other blocks 918 stored on the ledger 902. Once the solver has determined the solution to the block 918, the solver broadcasts a "proof of work" 920 to the other nodes 910. In embodiments, the proof of work 920 may be the block identifier of the previous block 918. In embodiments, each of the non-solving nodes 910 (potentially including the ledger management system 214), may receive the proof of work and may validate the proof of work based on the copy of the distributed ledger 902 that is stored at the node 910. In these embodiments, each node 910 may determine whether the block identifier contained in the proof of work corresponds to (e.g., matches) a block identifier of a block stored on the local copy of the ledger 902. If a node 910 is able to validate the proof of work, the verifying node 910 may transmit a verification vote 906 to the ledger management system 214 and/or one or more of the other nodes 910 in the network. In embodiments, the verifying node may broadcast the verification vote 906 to each of the other nodes 910 in the network (including the ledger management system 214). In embodiments, the verifying node 910 may transmit the verification vote 906 only to the ledger management system 214 or to the node 910 that requested verification of the block 918 to be verified. In the event a non-solving node 910 cannot validate the proof of work (i.e., the node 910 does not find a matching block identifier of a block 918 stored on the local copy of the ledger 902), the non-solving node 910 can either send nothing or send a denial vote (i.e., a communication indicating that the proof of work could not be verified).

Verification of a block 918 may further include an arbitration process. In embodiments, the ledger management system 214 can act as the arbiter. In these embodiments, the ledger management system 214 may receive the verification votes 906 from any of the nodes 910 that were able to verify the proof of work 920 and may determine whether to verify the block 918 based on the received verification votes 906. The ledger management system 214 may implement any suitable arbitration approach to determine whether a block 918 was verified by the network 900. For instance, ledger management system 214 may implement a majority consensus approach (e.g., a block is verified when more than 50% of the nodes 910 provided a verification vote 906 corresponding to the proof of work). In embodiments, the ledger management system 214 may implement a Byzantine approach to determine whether there was a consensus reached. The ledger management system 214 may implement alternative arbitration means as well.

In embodiments, the ledger management system 214, in conjunction with the other nodes 910 in the network 900, maintains an immutable record of any operations performed with respect to a deal using the deal room platform 100. In these embodiments, any time a user performs an operation (e.g., adds a new user to the deal, grants a user a permission, uploads a document, edits a document, views a document, downloads a document, prints a document, deletes a document, requests to a use a service 904, and the like) with respect to a deal hosted on the deal room platform 100, the ledger management system 214 may: generate a new event state record corresponding to the operation; encode the new event state record into a new block data structure and a block identifier of a previous block (e.g., the most recently added block) into a block header of the new block data structure; and hash the new block data structure using a hashing function to obtain the new block. Furthermore, in some embodiments, the ledger management system 214 may transmit a request 9080 to verify the new block 918 to the other nodes 918 in the network 908. In some embodiments, one of the nodes 910 may attempt to determine a solution to the new block 918. If a valid solution is determined, the solver node 910 may transmit a proof of work 920 to the other nodes 910 in the network 900, and the other nodes 910 may attempt to validate the proof of work 920. If a node 910 is able to validate the proof of work 920, the node transmits a validation vote 906 to the ledger management system 214 (or potentially to another node 910 that will act as an arbiter). The ledger management system 214 (or the acting arbiter node 910) may then validate the new block 918 based on the received verification votes 906. If the new block 910 is validated, the ledger management system 214 may store the new block 918 on its copy of the ledger and may transmit the new block 908 to each of the nodes 910, whereby each node 910 may store the new node 910 on its local copy of the ledger 902. It is noted that in some embodiments, the proof of work and/or verification steps are not required, as the network 900 may be a trusted network of nodes 910.

In embodiments, the ledger management system 214 utilizes a cryptographic ledger 902 to manage permissions of different participants in a respective deal (also referred to as "users"). In embodiments, permissions may be granted with respect to a document or set of documents. For example, permissions may include permission for a user to upload a document or set of documents, permission for a user to view a document or set of documents, permission for a user to edit a document or set of documents, permission for a user to delete a document or set of documents, permission for a user to download a document or set of documents, permission for a user to print a document or set of documents, and the like. Permissions may additionally or alternatively relate to services 904 that are offered by the deal room platform 100. For example, permissions may include permission for a user to access a full-text search functionality on the deal room platform, permission for the user to use a virus scanner offered by the deal room platform 100, permission for the user to have the deal room platform 100 generate a machine-generated document, and the like. Permissions may also include the permissions to grant other users permission to perform an operation.

In embodiments, the ledger management system 214 may manage individual participant's access to respective services 904 by generating one or more unique service-specific permission keys 914 for a respective service 904 and issuing each respective unique service-specific permission key 914 to a respective participant that has been granted access to the respective service 904. In some of these embodiments, the ledger management system 214 may utilize the cryptographic ledger 914 to store proof of the service-specific permission keys 914 and to manage permissions to the services 904. In these embodiments, the ledger management system 214 may: receive an instruction to grant a user permission to access a particular service; generate a service-specific permission key 914 corresponding to the particular service and assign the key 914 to the user; encode a user id of the user and the service-specific permission key 914 in an state change event record; generate a new block based on the state change event record and a block identifier of a previously stored block; store the new block on its local copy of the cryptographic ledger 902, and broadcast the new block to other nodes 910 in the network for storage on the respective copies of the ledger 902 stored at the nodes. In embodiments, the ledger management system 214 may validate the new block prior to storing and transmitting the block for storage at the other nodes 910. The ledger management system 214 may further transmit the new block to a computing device associated with the user (which may or may not be a participating node), whereby an agent 916 on the computing device may store the new block. In this way, the agent 916 may use the new block to obtain access to the particular service, when the user attempts to access the particular service 904 from the computing device. When the user attempts to access the particular service 904, the agent may communicate the block containing the permission key 914 corresponding to the particular service 904 to the ledger management system 214. The ledger management system 914 may solve the received block and/or validate the received block, in the manner described above. If the ledger management system 214 is able to validate the received block, the ledger management system 214 grants the computing device of the user access to the service 902, whereby the user may begin using the service 904. In embodiments, permissions and access to documents that are stored in a deal room organizational structure may be managed in a similar way, where users are granted document-specific or folder-specific permission keys 914, where these permission keys 914 correspond to specific operations that a user may perform on the document or folder(s) with which the permission keys 914 are associated.

In embodiments, the ledger management system 214 and/or one or more computing node computing devices 910 having requisite processing resources may generate an immutable log of a transaction based on the cryptographic ledger 302. In these embodiments, the ledger management system 214 and/or the nodes 910 (referred collectively as the solving nodes 910) may begin solving the most recent blocks 908 in the cryptographic ledger 302. Each time a block is solved, the solving node 910 may transmit the proof of work 920 to other nodes 910, which may then verify the accuracy of the solution. The solving nodes 910 may iteratively solve each of the blocks 918 in the cryptographic ledger 902 in this manner until the entire ledger 902 is solved, thereby resulting in an operation log of the deal. The operational log may define the actions or operations that were performed using the deal room in which the deal is being hosted. As can be appreciated from the foregoing description, by creating, validating, and solving the blocks 918 of the cryptographic ledger 902 in the manners described above, the ledger 902 is generated in a transparent and secure manner. The resultant operational log is stored in an encrypted manner until it is solved, and once solved the operational log is auditable and immutable. The operational log may indicate each time a user was added to the deal, the permissions that each user was granted, the requests to perform operations or use services 904 that each user initiated, the operations that were performed in connection with the deal room (e.g., adding a new user to the deal, granting a user a permission, uploading a document, editing a document, viewing a document, downloading a document, printing a document, deleting a document, using a service 904, and the like), the user that performed the operation, and the like.

In embodiments, the solving nodes 910 may optimize the solving of the ledger 902 by solving different blocks 918 in a distributed manner. For example, if the cryptographic ledger 202 includes one or more forks (e.g., when more than one child block points 918 to the same parent block 918), the cryptographic ledger 202 may be said to fork at the parent block 918. In this example, each chain originating at the fork may have a final block 918 (or leaf block 918). In this scenario, different solving nodes 910 may begin solving the ledger 902 at different leaf blocks 918 in a breadth-first or depth-first manner, thereby increasing the speed at which the ledger 902 is solved.

In embodiments, the ledger management system 214 may be configured to facilitate collaboration between parties in a deal by assisting in the execution of a workflow associated with the deal using, for example, smart contracts. In these embodiments, the ledger management system 214 may provide a deal workflow that is defined to facilitate a respective type of deal. For example, for a merger, the ledger management system 214 may provide a merger and acquisition deal workflow that defines various tasks that must be completed before a next step can be performed in the merger. In this example, the deal merger and acquisition deal workflow may require that a document uploading phase must be completed prior to moving on to a question and answer due diligence phase of the deal. Another condition may be that one or more parties having adequate permission to sign a document must electronically execute a document before moving a deal to a financing phase of the deal. The workflows may be preconfigured based on the type of deal and/or may be customized by one or more parties associated with the deal. In embodiments, each workflow may be encoded in a smart contract, whereby the smart contract may control the phases of the workflow when the smart contract determines that one or more required conditions are met. In embodiments, copies of a smart contract are stored and executed by the agents 916 of one or more respective nodes 910. The agent 916 may facilitate the performance of operations that are defined in the smart contract (including validating permissions to perform the operations using the cryptographic ledger 302), the reporting and recording of the performance of the operations (e.g., by generating blocks or requesting generation of blocks from the ledger management system 214), and/or verifying that one or more conditions defined in the smart contract are met. Once a consensus is achieved with respect to one or more required conditions, the deal may progress to a next phase in the workflow. In this way, the network 900 (i.e., the ledger management system 214 and the participating nodes 910) may facilitate collaboration between parties in the deal by assisting in the execution of the workflow associated with the deal by validating pre-closing and closing work and/or providing a framework for the deal by way of smart contracts.

It is envisioned that the ledger management system 214 may leverage the cryptographic ledger 902 for additional or alternative application without departing from the scope of the disclosure.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various portions of methods identified and described above may be varied, and that the order of any one method may be adapted to particular applications of the techniques disclosed herein. All such variations and modifications are intended to fall within the scope of this disclosure. As such, the depiction and/or description of an order for various portions of the method should not be understood to require a particular order of execution, unless required by a particular application, or explicitly stated or otherwise clear from the context.

The methods and/or processes described above, and portions associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the portions thereof. In another aspect, the methods may be embodied in systems that perform the portions thereof and may be distributed across devices in a number of ways, or all of the functionality may be integrated into a dedicated, standalone device or other hardware. In another aspect, the means for performing the portions of the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. For example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

While the disclosure has been disclosed in connection with the many embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "set" is to be construed as a group having one or more members. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A method for managing documents in an electronic deal room associated with a multi-party transaction, the method comprising:
   receiving, by a processing system of a deal room platform, a request to upload a document to the electronic deal room from a user device associated with a user participating in the multi-party transaction;
   in response to an approved request, receiving, by the processing system, the document from a document source;
   determining, by the processing system, a classification of the document based on content of the document and a machine-learned document classification model that is trained to classify documents involved in multi-party transactions by comparing content of a document with content of documents having known classifications;
   identifying, by the processing system, one or more folders of an organizational structure having a plurality of folders corresponding to the electronic deal room with which to associate the document based on the determined classification of the document;
   at least one of automatically creating a link or automatically storing, by the processing system, the document with respective ones of the one or more folders, based on the determined classification of the document; and
   providing at least one of a notification of one or more risks associated with the multi-party transaction or a prediction related to the one or more risks on at least one of a user device or a graphical user interface.

2. The method of claim 1, wherein the machine-learned classification model is trained on a plurality of training data sets, each training data set including one or more documents.

3. The method of claim 2, wherein each training data set includes at least one labeled document, wherein the label indicates a respective classification of the labeled document.

4. The method of claim 2, wherein one or more training data sets of the plurality of training data sets are obtained from historical data associated with the deal room platform.

5. The method of claim 4, wherein the historical data includes classifications of previously uploaded documents that were uploaded to the deal room platform in connection with other multi-party transactions.

6. The method of claim 2, wherein one or more training data sets of the plurality of training data sets are obtained from an expert that labeled the at least one labeled document of each of the one or more training data sets.

7. The method of claim 2, wherein a training data set of the plurality of training data sets includes feedback data relating to a previous classification of a previously uploaded document that was classified by the system, wherein the feedback data is used to reinforce the machine-learned classification model.

8. The method of claim 2, wherein the machine-learned classification model is trained using a training data set of the plurality of training data sets that includes one or more unlabeled documents.

9. The method of claim 8, further comprising training the machine-learned classification model based on the one or more unlabeled documents and one or more labeled documents, wherein each respective labeled document is labeled with a respective classification of the respective labeled document.

10. The method of claim 9, wherein training the machine-learned classification model includes clustering the one or more unlabeled documents with the one or more labeled documents based on respective features of the one or more unlabeled documents and the one or more labeled documents to determine respective classifications of the unlabeled documents.

11. The method of claim 2, further comprising training the machine-learned classification model based on respective results of natural language processing of each document in the plurality of training data sets.

12. The method of claim 1, wherein the multi-party transaction is one of a merger, an acquisition, a financing, or an investment round.

13. The method of claim 1, wherein the machine-learned classification model classifies different types of contracts associated with a type of the multi-party transaction.

14. The method of claim 1, wherein the machine-learned classification model classifies different types of documents having no contractual components associated with a type of the multi-party transaction.

15. The method of claim 1, further comprising:
identifying, by the processing system, one or more content segments of the document;
for each content segment:
extracting, by the processing system, one or more features of the content segment; and
determining, by the processing system, a content classification of the content segment based on the one or more features of the content segment and a machine-learned content extraction and classification model that is trained to identify one or more different types of content segments.

16. The method of claim 14, wherein the classification of the document is based at least in part on at least one of the content classifications.

17. The method of claim 14, further comprising generating an advisory memo using a natural language generation system based on a content classification corresponding to one of the content segments.

18. The method of claim 16, wherein the advisory memo includes a location in the document where the content segment to which the content classification corresponds is located.

19. The method of claim 16, wherein the advisory memo includes the content segment to which the content classification corresponds.

20. An apparatus for managing documents in an electronic deal room associated with a multi-party transaction, comprising:
a processor; and
a memory having stored therein at least one program, the at least one program including instructions which, when executed by the processor, cause the apparatus to perform a method, comprising;
receiving, by a processing system of a deal room platform, a request to upload a document to the electronic deal room from a user device associated with a user participating in the deal;
in response to an approved request, receiving, by the processing system, the document from a document source;
determining, by the processing system, a classification of the document based on content of the document and a machine-learned document classification model that is trained to classify documents involved in multi-party transactions by comparing content of a document with content of documents having known classifications;
identifying, by the processing system, one or more folders of an organizational structure having a plurality of folders corresponding to the electronic deal room with which to associate the document based on the determined classification of the document; and
at least one of automatically creating a link or automatically storing, by the processing system, the document with respective ones of the one or more folders, based on the determined classification of the document; and
providing at least one of a notification of one or more risks associated with the multi-party transaction or a prediction related to the one or more risks on at least one of a user device or a graphical user interface.

* * * * *